US009699601B2

(12) United States Patent
Grayson et al.

(10) Patent No.: US 9,699,601 B2
(45) Date of Patent: Jul. 4, 2017

(54) SYSTEM AND METHOD FOR MANAGING INTERFERENCE IN A NETWORK ENVIRONMENT BASED ON USER PRESENCE

(71) Applicant: CISCO TECHNOLOGY, INC., San Jose, CA (US)

(72) Inventors: Mark Grayson, Maidenhead (GB); Anton Okmyanskiy, Vancouver (CA); Ziv Nuss, Tsur Yigal (IL); Swaminathan A. Anantha, Mountain View, CA (US); Andrea Giustina, Castle Combe (GB); Mickael James Graham, Bellevue Hill (AU); Santosh Ramrao Patil, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 165 days.

(21) Appl. No.: 14/679,868

(22) Filed: Apr. 6, 2015

(65) Prior Publication Data
US 2016/0295357 A1    Oct. 6, 2016

(51) Int. Cl.
*H04W 4/00* (2009.01)
*H04B 7/00* (2006.01)
(Continued)

(52) U.S. Cl.
CPC ......... *H04W 4/02* (2013.01); *H04W 36/165* (2013.01); *H04W 52/283* (2013.01);
(Continued)

(58) Field of Classification Search
CPC ..... H04W 4/02; H04W 36/165; H04W 52/38; H04W 64/006; H04W 68/02; H04W 84/12; H04W 84/18
See application file for complete search history.

(56) References Cited

U.S. PATENT DOCUMENTS 6,483,820 B1   11/2002  Davidson et al.
7,379,739 B2   5/2008   Rajkotia et al.
(Continued)

FOREIGN PATENT DOCUMENTS

CN    102378288        3/2012
CN    104684052 A      6/2015
(Continued)

OTHER PUBLICATIONS

"LTE Quick Reference: CCE Index Calculation," LTE Handbook, Share Technote, First published on or about Jul. 8, 2012 http://www.sharetechnote.com/html/Handbook_LTE_CCE+Index.html.
(Continued)

*Primary Examiner* — Lonnie Sweet
(74) *Attorney, Agent, or Firm* — Patent Capital Group

(57) ABSTRACT

An example method is provided in one example embodiment and may include determining a presence of user equipment (UE) in relation to small cell radio(s) of a small cell network based on information obtained through the small cell network and one or more parallel networks; and adjusting transmit power for the small cell radio(s) based on the presence of UE in relation to the small cell radio(s). Another example method can include determining that a UE in cell paging channel mode has changed its selected macro cell radio; determining that the UE is allowed service on a small cell radio located in a vicinity of a macro cell coverage area of a selected macro cell radio; and adjusting a transmit power of the small cell radio based on a presence of the UE in a surrounding macro cell coverage area of the small cell radio.

20 Claims, 9 Drawing Sheets

(51) Int. Cl.
*H04W 24/00* (2009.01)
*H04W 4/02* (2009.01)
*H04W 36/16* (2009.01)
*H04W 64/00* (2009.01)
*H04W 68/02* (2009.01)
*H04W 52/28* (2009.01)
*H04W 84/12* (2009.01)
*H04W 52/24* (2009.01)
*H04W 84/18* (2009.01)
*H04W 84/04* (2009.01)

(52) U.S. Cl.
CPC ......... *H04W 64/006* (2013.01); *H04W 68/02* (2013.01); *H04W 52/244* (2013.01); *H04W 84/045* (2013.01); *H04W 84/12* (2013.01); *H04W 84/18* (2013.01)

(56) References Cited

U.S. PATENT DOCUMENTS

| | | | |
|---|---|---|---|
| 7,983,667 | B2 | 7/2011 | Hart et al. |
| 8,107,950 | B2 | 1/2012 | Amirijoo et al. |
| 8,320,965 | B2 | 11/2012 | Kwun |
| 8,340,703 | B2 | 12/2012 | Laroia et al. |
| 8,340,711 | B1 | 12/2012 | Glass et al. |
| 8,437,810 | B2 | 5/2013 | Hussain |
| 8,588,698 | B2 | 11/2013 | Brisebois |
| 8,611,299 | B2 | 12/2013 | Yang et al. |
| 8,639,243 | B2 | 1/2014 | Radulescu et al. |
| 8,712,459 | B2 | 4/2014 | Lim et al. |
| 8,792,886 | B2 | 7/2014 | Meshkati |
| 8,811,905 | B1 | 8/2014 | Hui et al. |
| 8,830,936 | B2 | 9/2014 | Ren |
| 9,131,462 | B1 | 9/2015 | Verghese |
| 9,143,995 | B2 | 9/2015 | Okmyanskiy et al. |
| 9,219,816 | B2 | 12/2015 | Grayson et al. |
| 9,226,255 | B2 | 12/2015 | Grayson et al. |
| 9,414,310 | B2 | 8/2016 | Grayson |
| 9,450,695 | B2 | 9/2016 | Zhu |
| 2004/0203746 | A1* | 10/2004 | Knauerhase .... H04M 1/274516 455/432.1 |
| 2005/0036462 | A1 | 2/2005 | Sillasto et al. |
| 2005/0153692 | A1* | 7/2005 | Hwang ................. H04W 48/12 455/434 |
| 2006/0034236 | A1* | 2/2006 | Jeong .................... H04W 48/10 370/338 |
| 2006/0229087 | A1 | 10/2006 | Davis et al. |
| 2007/0008885 | A1 | 1/2007 | Bonner |
| 2008/0039089 | A1* | 2/2008 | Berkman ............. H04W 36/04 455/436 |
| 2009/0280854 | A1* | 11/2009 | Khan ................. H04W 52/287 455/522 |
| 2010/0002614 | A1* | 1/2010 | Subrahmanya ..... H04W 52/244 370/311 |
| 2010/0056184 | A1 | 3/2010 | Vakil |
| 2010/0112982 | A1 | 5/2010 | Singh et al. |
| 2010/0203891 | A1 | 8/2010 | Nagaraja |
| 2010/0240314 | A1 | 9/2010 | Chang |
| 2010/0260036 | A1 | 10/2010 | Molnar et al. |
| 2010/0260068 | A1 | 10/2010 | Bhatt et al. |
| 2010/0279628 | A1 | 11/2010 | Love et al. |
| 2011/0110316 | A1 | 5/2011 | Chen et al. |
| 2011/0211514 | A1 | 9/2011 | Hamalainen |
| 2012/0004003 | A1 | 1/2012 | Shaheen et al. |
| 2012/0015657 | A1 | 1/2012 | Comsa et al. |
| 2012/0100849 | A1 | 4/2012 | Marsico |
| 2012/0100851 | A1 | 4/2012 | Zheng |
| 2012/0129537 | A1 | 5/2012 | Liu et al. |
| 2012/0252457 | A1 | 10/2012 | Shindo |
| 2012/0258720 | A1 | 10/2012 | Tinnakornsrisuphap et al. |
| 2012/0265888 | A1 | 10/2012 | Roeland et al. |
| 2012/0327850 | A1 | 12/2012 | Wang et al. |
| 2013/0003697 | A1 | 1/2013 | Adjakple et al. |
| 2013/0077482 | A1 | 3/2013 | Krishna et al. |
| 2013/0102313 | A1 | 4/2013 | Tinnakornsrisuphap et al. |
| 2013/0136072 | A1 | 5/2013 | Bachmann et al. |
| 2013/0163543 | A1 | 6/2013 | Freda et al. |
| 2013/0182680 | A1 | 7/2013 | Choi et al. |
| 2013/0210431 | A1 | 8/2013 | Abe |
| 2013/0229945 | A1 | 9/2013 | Cha et al. |
| 2013/0294356 | A1 | 11/2013 | Bala et al. |
| 2013/0308531 | A1 | 11/2013 | So et al. |
| 2013/0326001 | A1 | 12/2013 | Jorgensen et al. |
| 2013/0337821 | A1 | 12/2013 | Clegg |
| 2013/0339783 | A1 | 12/2013 | Fernandez Alonso et al. |
| 2013/0343288 | A1 | 12/2013 | Ratasuk et al. |
| 2013/0343304 | A1 | 12/2013 | Kaippallimalil et al. |
| 2014/0003225 | A1 | 1/2014 | Mann et al. |
| 2014/0010086 | A1 | 1/2014 | Etemad et al. |
| 2014/0011505 | A1 | 1/2014 | Liao |
| 2014/0078986 | A1 | 3/2014 | Kaippallimalil et al. |
| 2014/0086226 | A1 | 3/2014 | Zhao et al. |
| 2014/0112251 | A1 | 4/2014 | Kim et al. |
| 2014/0146732 | A1 | 5/2014 | Olufunmilola et al. |
| 2014/0155109 | A1 | 6/2014 | Vaidya et al. |
| 2014/0241316 | A1 | 8/2014 | Okmyanskiy et al. |
| 2014/0287769 | A1 | 9/2014 | Taori |
| 2014/0301351 | A1 | 10/2014 | Gao |
| 2014/0342745 | A1 | 11/2014 | Bhushan |
| 2015/0016419 | A1 | 1/2015 | Kim |
| 2015/0045048 | A1* | 2/2015 | Xu ........................ H04W 4/023 455/452.1 |
| 2015/0119063 | A1 | 4/2015 | Yu et al. |
| 2015/0133130 | A1 | 5/2015 | Gupta |
| 2015/0146594 | A1 | 5/2015 | Grayson |
| 2015/0148036 | A1 | 5/2015 | Grayson et al. |
| 2015/0296516 | A1 | 10/2015 | Jung |
| 2015/0341821 | A1 | 11/2015 | Hong |
| 2015/0351072 | A1 | 12/2015 | Okmyanskiy et al. |
| 2016/0007170 | A1 | 1/2016 | Vaidya et al. |
| 2016/0007316 | A1 | 1/2016 | Vaidya et al. |
| 2016/0007378 | A1 | 1/2016 | Bertorelle |
| 2016/0037490 | A1 | 2/2016 | Pazhyannur et al. |
| 2016/0037560 | A1 | 2/2016 | Liu |
| 2016/0183174 | A1 | 6/2016 | Xie |
| 2016/0255531 | A1 | 9/2016 | Stein |
| 2016/0295521 | A1 | 10/2016 | Grayson |

FOREIGN PATENT DOCUMENTS

| | | |
|---|---|---|
| EP | 2466972 | 6/2012 |
| EP | 2757850 | 7/2014 |
| EP | 2879444 | 6/2015 |
| EP | 2981119 | 2/2016 |
| WO | WO2011/085238 | 7/2011 |
| WO | WO 2011/134529 | 11/2011 |
| WO | WO2011/137345 | 11/2011 |
| WO | WO2012/055984 | 5/2012 |
| WO | WO2013/041574 | 3/2013 |
| WO | WO2013/082245 | 6/2013 |
| WO | WO2013/086659 | 6/2013 |
| WO | WO2013/169991 | 11/2013 |

OTHER PUBLICATIONS

"LTE Quick Reference: Resource Allocation and Management Unit," LTE Handbook, Share Technote, First published on or about Jul. 13, 2012 http://www.sharetechnote.com/html/Handbook_LTE_ResourceAllocation_ManagementUnit.html.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12)," [Relevant Sections 3, 4, 8 and 8 only], ETSI, 650 Route des Lucioles, F-06921, Sophia Antipolis Cedex-France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.

(56) References Cited

OTHER PUBLICATIONS

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.5 only]; ETSI, 650 Route des Lucioles, F-06921, Sophia Antipolis Cedex-France, Sep. 2014.
"GSMA LTE Roaming Guidelines, Version 9.0," GSM Association, Official Document IR88, Jan. 24, 2013; 53 pages.
"Paging Channel Selection," UMTS World; first published on or about Jun. 22, 2003; 3 pages http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.
USPTO Sep. 2, 2015 Non-Final Office Action from U.S. Appl. No. 14/092,448.
U.S. Appl. No. 14/822,195, filed Aug. 10, 2015, entitled "System and Method for Hand-In Disambiguation Using User Equipment Wifi Location in a Network Environment," Inventor(s): Anton Okmyanskiy, et al.
U.S. Appl. No. 15/051,387, filed Feb. 23, 2016, entitled "System and Method to Provide Power Management for a Multimode Access Point in a Network Environment," Inventor(s): Santosh Ramrao Patil, et al.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 23-203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.
Adrangi, F., et al., "Chargeable User Identity," Network Working Group RFC 4372, Jan. 2006, 10 pages.

(56) References Cited

OTHER PUBLICATIONS

Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Ashraf, Imran, "Distributed Radio Coverage Optimization in Enterprise Femtocell Networks," International Conference on Communications ICC 2010, May 23-27, 2010, Cape Town, South Africa; 6 pages.
"Legacy UE Macro to HNB Active Hand-in," 3GPP TSG RAN WG3 Document No. R3-112600, Oct. 14, 2011, pp. 1-4.
"Submission to 3GPP TSG-RAN WG2 Meeting 66 bis," Document No. 62-093921; Jul. 3, 2009, pp. 1-2.
Calhoun, P., "Diameter Base Protocol," Network Working Group RFC 3488, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Droms, R., "Dynamic Host Configuration Protocol," Network Working Group RFC 2131, Mar. 1997; 45 pages.
ETSI TS123 401 V12.70 (Jan. 2015) Technical Specification: "LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
ETSI TS125 367 V9.4.0, "Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holbrook, H., et al., "Source-Specific-Multicast for IP," Network Working Group RFC 4607, Aug. 2006.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Saad, Sawsan A., et al., "A Survey on Power Control Techniques in Femtocell Networks," Journal of Communications vol. 8, No. 12, Dec. 2013; 10 pages.
Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.
"3GPP TS 23.401 V13.5.0 (Dec. 2015) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles, F-06921, Sophia Antipolis Cedex-France, Dec. 2015; 337 pages.
"802.11 Association Process Explained," Cisco Meraki, Article ID 2110; First published on or about Sep. 19, 2015; 3 pages https://documentation.meraki.com/MR/WiFi_Basics_and_Best_Practices/802.11_Association_process_explained.
Boccardi, Federico, et al., "Power Savings in Small Cell Deployments via Sleep Mode Techniques," Jan. 2010, 6 pages http://www.researchgate.net/publication/251976899.
Cai, Shijie, et al., "Power-Saving Heterogeneous Networks through Optimal Small-Cell Scheduling," GlobalSIP 2014: Energy Efficiency and Energy Harvesting Related Signal Processing and Communications, Dec. 3-5, 2014; 5 pages.
"Cisco Aironet 3700 Series Access Points," Data Sheet, Cisco Systems, Inc., C78-729421-04, Sep. 2014; 10 pages.
"Cisco Mobility IQ," Cisco Systems, C45-733657-00, Feb. 2015; 2 pages.
"Cisco Mobility Services Engine (up to Release 8.0 Software) Data Sheet," Cisco Systems, Published on or about Sep. 15, 2015; 9 pages http://www.cisco.com/c/en/us/products/collateral/wireless/mobility-services-engine/data_sheet_c78-475378.html.
"Cisco Mobility Services Engine," Products and Services, Cisco Systems, First published on or about Feb. 23, 2014; 3 pages http://www.cisco.com/c/en/us/products/wireless/mobility-services-engine/index.html.
"Electric power," from Wikipedia, the free encyclopedia, Jan. 15, 2016; 6 pages.
"Electrical energy," from Wikipedia, the free encyclopedia, Jan. 20, 2016; 2 pages.
"Energy vs. Power, Difference and Comparison," Diffen.com, First published on or about Jul. 26, 2011; 3 pages.
"ETSI TS 125 467 V12.3.0 (Jan. 2015) Technical Specification: Universal Mobile Telecommunications System (UMTS); UTRAN architecture for 3G Home Node B (HNB); Stage 2 (3GPP TS 25.467 version 12.3.0 Release 12)," European Telecommunications Standards Institute, 650 Route des Lucioles, F-06921 Sophia Antipolis Cedex, France, Jan. 2015; 93 pages.
"ETSI TS 132 593 V12.0.0 (Oct. 2014) Technical Specification: LTE; Telecommunication management; Home enhanced Node B (HeNB) Operations, Administration, Maintenance and Provisioning (OAM&P); Procedure flows for Type 1 interface HeNB to HeNB Management System (HeMS) (3GPP TS 32.593 version 12.0.0 Release 12)," European Telecommunications Standards Institute, 650 Route des Lucioles, F-06921 Sophia Antipolis Cedex, France, Oct. 2014; 21 pages.
"IEEE Std 802.11—2012 (Revision of IEEE Std 802.11-2007: Part 11: Wireless LAN Medium Access Control (MAC) and Physical Layer (PHY) Specifications IEEE Standard for Information technology—Telecommunications and information exchange between systems; Local and metropolitan area networks, Specific Requirements," IEEE Standards Association, IEEE Computer Society, Mar. 29, 2012; Relevant sections: 3, 4.10, and 8.3.3.6 only.
Lewis, Rob, "The Great 'Power vs. Energy' Confusion," CleanTechnica, Feb. 2, 2015; 17 pages; http://cleantechnica.com/2015/02/02/power-vs-energy-explanation.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-FRANCE, Jul. 2014; Section 4, pp. 17-88.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.
"Broadband Forum TR-196 Femto Access Point Service Data Model," Broadband Forum Technical Report, Issue 2, Issue Date: Nov. 2011, © The Broadband Forum. All Rights Reserved; 46 pages.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-196 Femto Access Point Service Data Model," Issue: 1, Issue Date: Apr. 2009, © The Broadband Forum; 131 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"ETSI TS 123 401 V9.5.0 (Jun. 2010) Technical Specification: LTE; General Packet Radio Service (GPRS) enhancements for Evolved

(56) References Cited

OTHER PUBLICATIONS

Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.
"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289-292; §8.5.21 pp. 357-365; §10.2.7 pp. 620-623; Annex B.3 pp. 2045-2052].
"ETSI TS-125-469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.
"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
USPTO Apr. 20, 2016 Notice of Allowance from U.S. Appl. No. 14/092,448.
U.S. Appl. No. 14/687,198, filed Apr. 15, 2015, entitled "System and Method for Managing Interference in a Network Environment Based on User Presence," Inventors: Mark Grayson, et al.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAPFAST.
EPO Mar. 26, 2015 Extended Search Report and Opinion from European Application Serial No. EP14190541.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"Radius," Wikipedia, the free encyclopedia, 12 pages [Retrieved and printed Oct. 11, 2013] http://en.wikipedia.org/wiki/RADIUS.
3GPP TS 32.522 v11.2.0, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
ETSI TS125 469 v11.2.0, "Universal Mobile Telecommunications System (UMTS); UTRAN Iuh interface Home Node B (HNB); Application Part (HNBAP) signaling (3GPP TS25.469 version 11.2.0 Release 11)," European Telecommunications Standards Institute, 650 Route des Lucioles, F-06921 Sophia Antipolis Cedex, France, Apr. 2013, 78 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
USPTO Oct. 26, 2016 Non-Final Office Action from U.S. Appl. No. 15/051,387.
USPTO Feb. 10, 2017 Non-Final Office Action from U.S. Appl. No. 14/687,198.

* cited by examiner

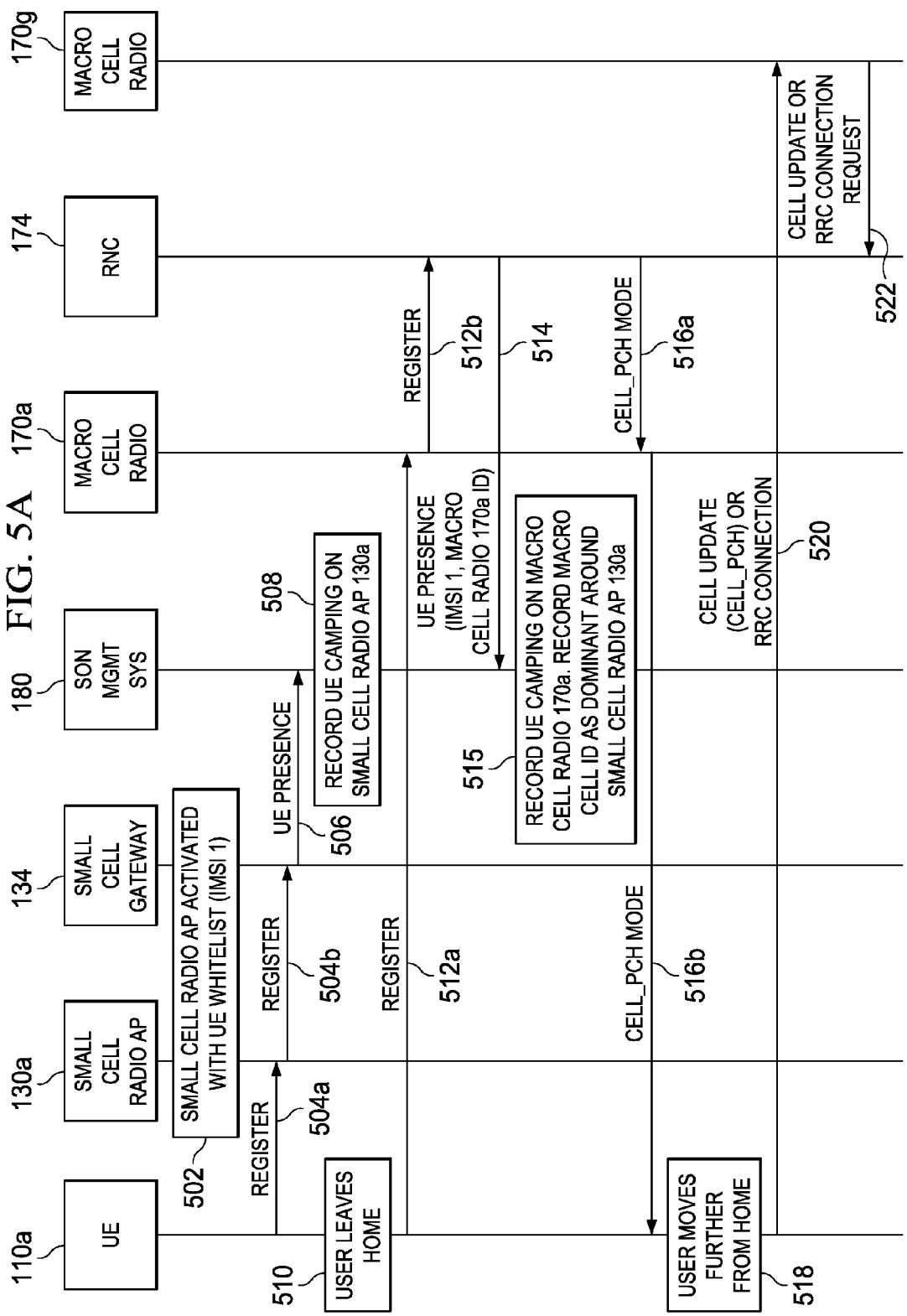

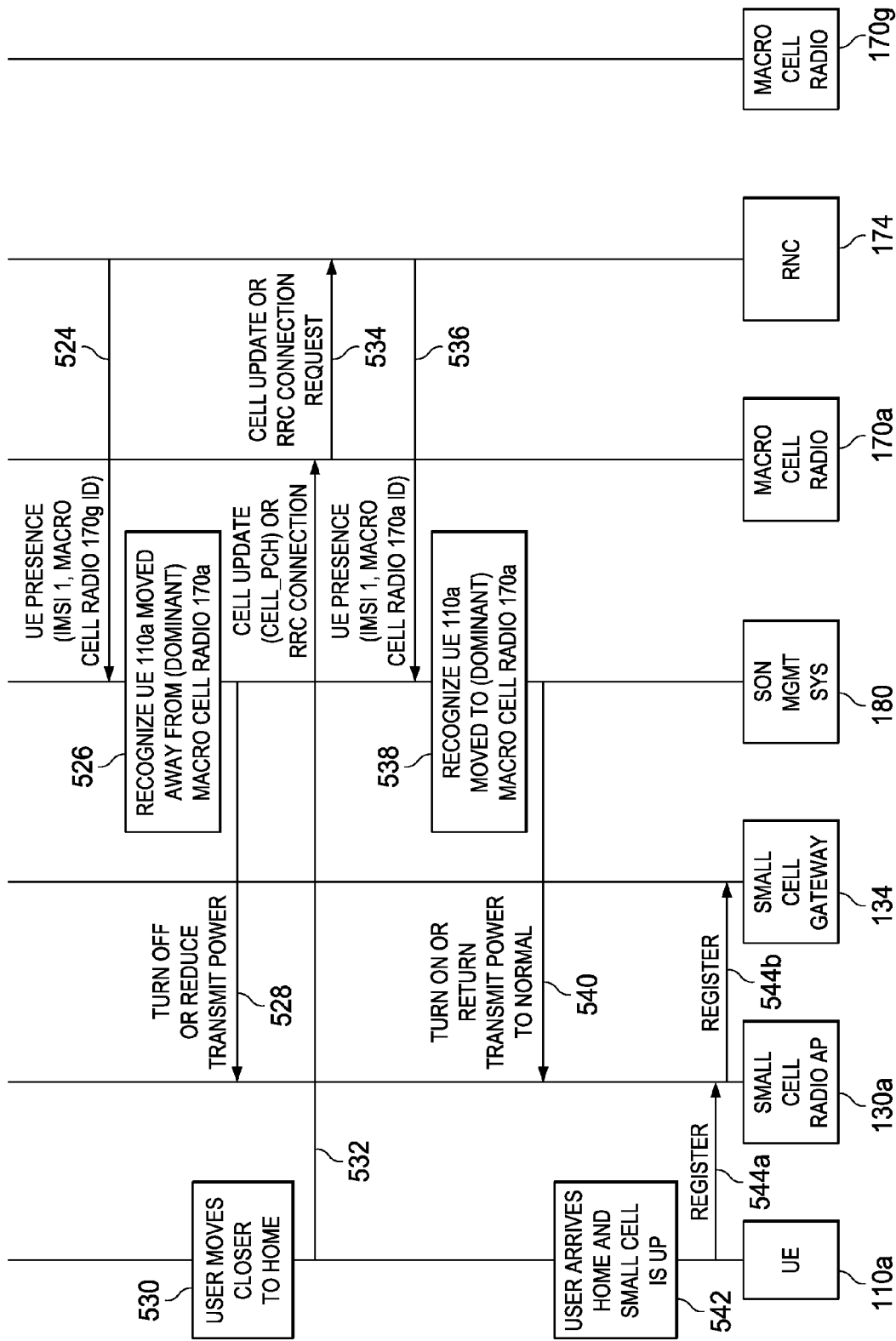

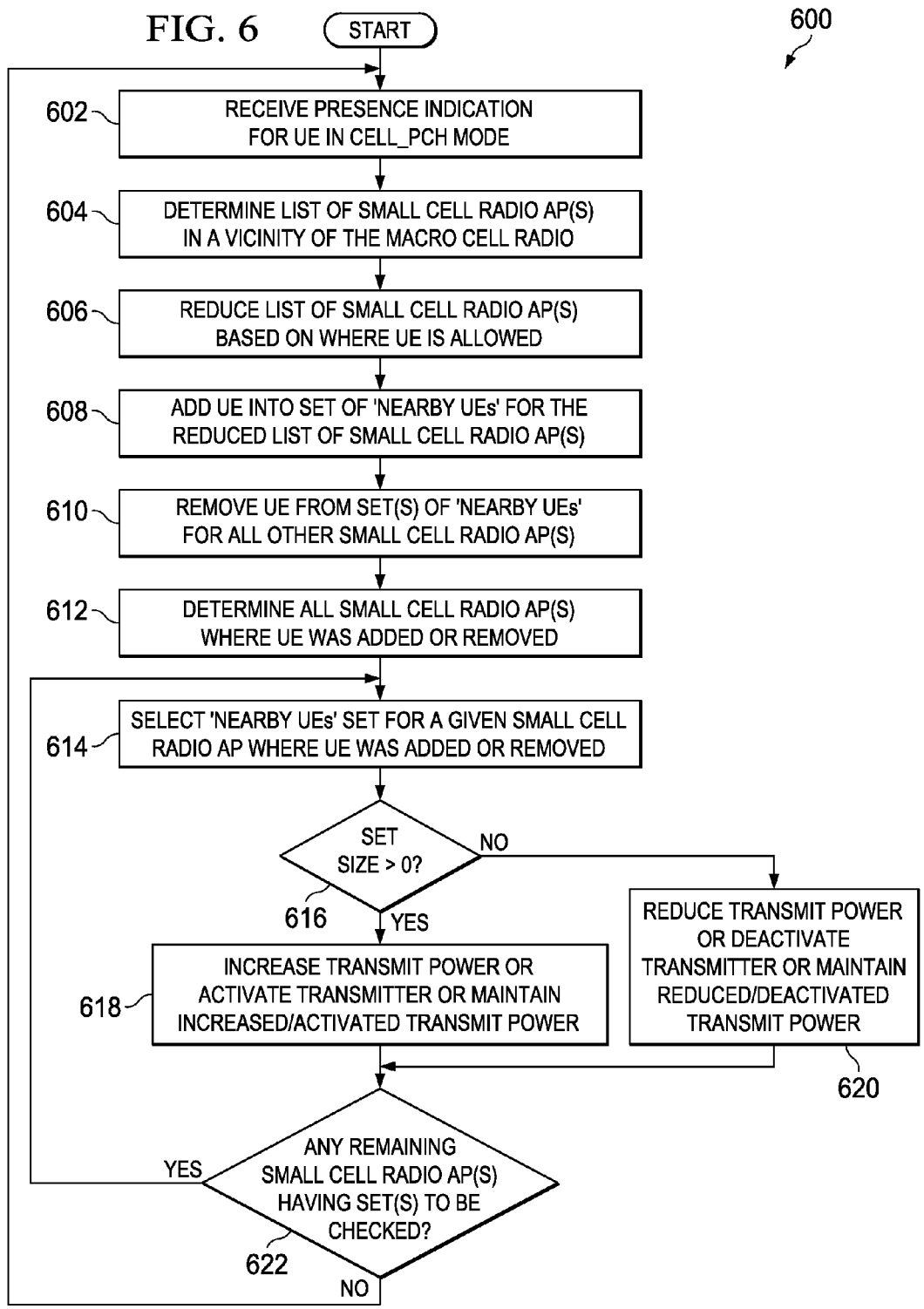

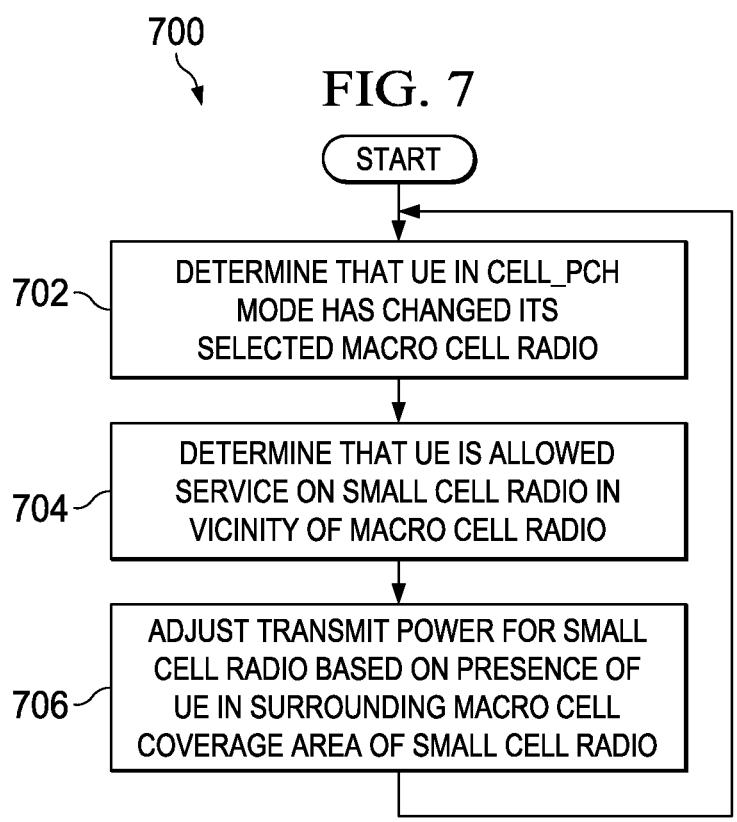

SYSTEM AND METHOD FOR MANAGING INTERFERENCE IN A NETWORK ENVIRONMENT BASED ON USER PRESENCE

TECHNICAL FIELD

This disclosure relates in general to the field of communications and, more particularly, to a system and method for managing interference in a network environment based on user presence.

BACKGROUND

Networking architectures have grown increasingly complex in communication environments. For example, small cells have gained notoriety due to their capabilities to connect wireless devices to a network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, interference can occur between cells for both small cell networks and macro cell networks. Interference between cells can degrade network performance as well as user experience. Accordingly, there are significant challenges in managing interference between cells for small cell network as well as macro cell networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5B are simplified interaction diagrams illustrating example interactions for an example use case associated with managing interference in a network environment based on user presence in accordance with one potential embodiment of the communication system;

FIG. 6 is a simplified flow diagram illustrating example operations associated with managing interference in a network environment based on user presence in accordance with one potential embodiment of the communication system;

FIG. 7 is a simplified flow diagram illustrating other example operations associated managing interference in a network environment based on user presence in accordance with one potential embodiment of the communication system.

DETAILED DESCRIPTION OF EXAMPLE EMBODIMENTS

Overview

Figure 1:
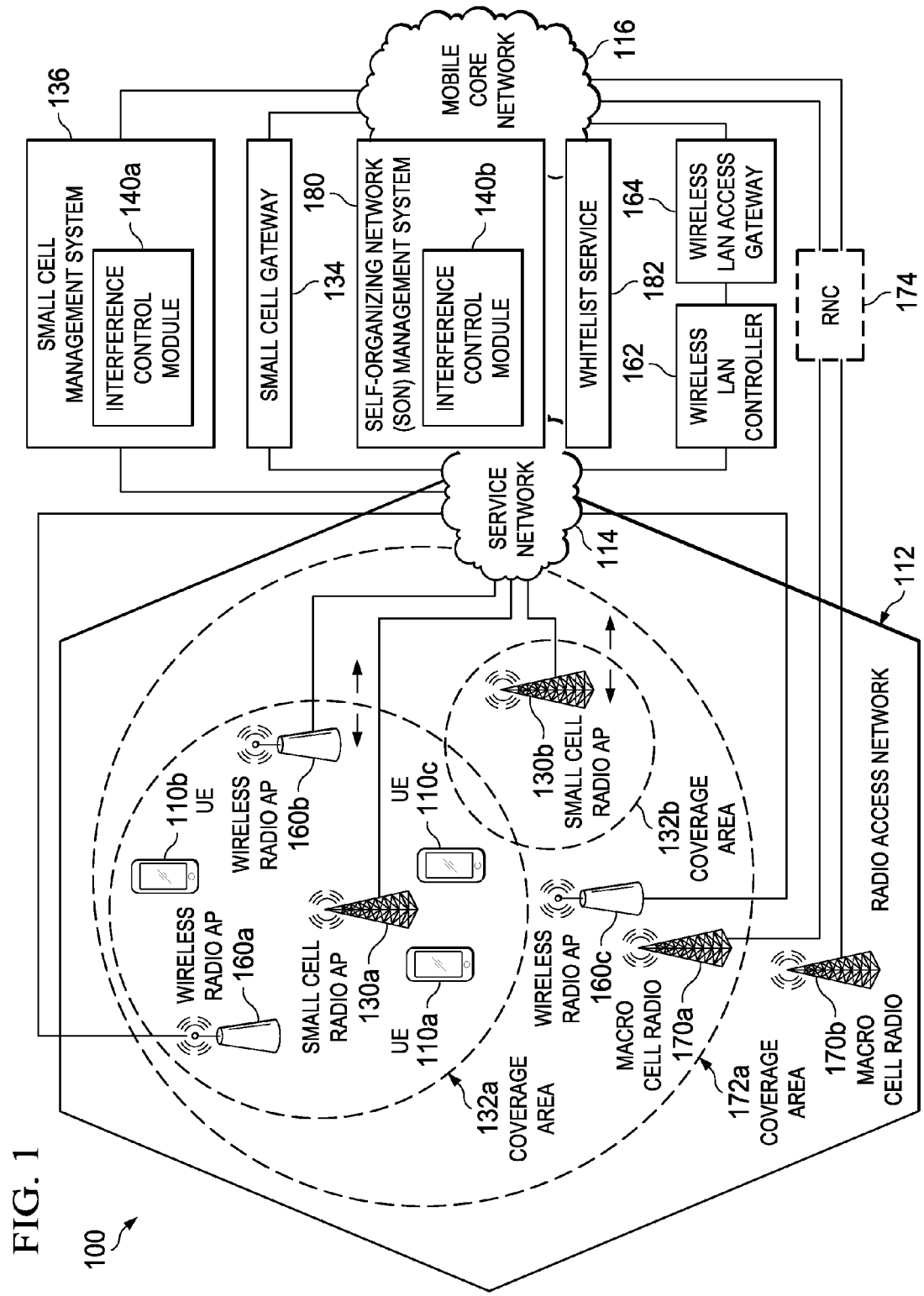
FIG. 1 is a simplified block diagram illustrating a communication system to facilitate managing interference in a network environment based on user presence according to one embodiment of the present disclosure.

A method is provided in one example embodiment and may include determining a presence of one or more user equipment (UE) in relation to one or more small cell radios of a small cell network based on information obtained through the small cell network and one or more parallel networks, wherein the one or more parallel networks include, at least in part, a wireless local area network (WLAN); and adjusting transmit power for one or more small cell radios of the small cell network based, at least in part, on the presence of one or more UE in relation to the one or more small cell radios of the small cell network. In some cases, determining the presence of the one or more UE can include detecting one or more location updates for the one or more UE within the small cell network. In other cases, determining the presence of the one or more UE can include detecting one or more wireless beacons of the one or more UE being received by one or more wireless radios of the wireless local area network.

In some instances, the method can include determining the presence of a particular UE in relation to one or more wireless radios of the WLAN; determining whether the particular UE is within a potential coverage area of a particular small cell radio based, at least in part, on a location of the one or more wireless radios of the WLAN; and increasing the transmit power for the particular small cell radio from a reduced transmit power level if the particular UE is within the potential coverage area of the particular small cell radio. In some cases, the potential coverage area of the particular small cell radio can be determined based, at least in part, on a coverage area provided by the particular small cell radio at a maximum transmit power, a normal transmit or a nominal transmit power.

In some cases, determining presence of the particular UE in relation to one or more wireless radio access points can further include receiving one or more wireless beacons transmitted by the particular UE at the one or more wireless radio access points of the WLAN; identifying a user associated with the particular UE based, at least in part, on a relationship between an International Mobile Subscriber Identity (IMSI) of the user and a Media Access Control (MAC) address for the particular UE; and determining whether the user is authorized to connect to the particular small cell radio, wherein the transmit power can be increased if the particular UE is authorized to connect to the particular small cell radio.

In some instances, adjusting the transmit power can include adjusting a pilot channel transmit power for each of the one or more small cell radios. In other instances, adjusting the transmit power can include reducing the transmit power for a particular small cell radio when no UE are determined to be present within a coverage area of the particular small cell radio.

In other cases, adjusting the transmit power can further include determining whether one or more UE are present in a coverage area of a particular small cell radio upon expiration of each of a plurality of timers; and reducing the transmit power for the particular small cell radio if no UE are present within the coverage area of the small cell radio at expiration of each of the plurality of timers.

In yet other cases, adjusting the transmit power can include increasing the transmit power for a particular small cell radio from a reduced level to one or more increased levels upon determining the presence of a plurality of UEs near a potential coverage area that the particular small cell radio is capable of providing. In still other cases, adjusting the transmit power can include increasing the transmit power for a particular small cell radio from a reduced level to normal level upon determining that the presence of a plurality of UEs near a potential coverage area that the particular small cell radio is capable of providing reaches a threshold number of UEs.

An additional method is provided in one example embodiment and may include determining that a user equipment (UE) in cell paging channel (CELL_PCH) mode has changed its selected macro cell radio; determining that the UE is allowed service on a small cell radio located in a vicinity of a macro cell coverage area of a selected macro cell radio; and adjusting a transmit power of the small cell radio based, at least in part, on a presence of the UE in a surrounding macro cell coverage area of the small cell radio. In some instances, the small cell radio may be in the vicinity of the macro cell coverage area of the selected macro cell if the small cell radio has a small cell coverage area that is within or neighbors the macro cell coverage area of the selected macro cell radio.

In some cases, the additional method can include determining one or more surrounding macro cell radios of the small cell radio; and determining one or more dominant macro cell radios from the one or more surrounding macro cell radios, wherein the one or more dominant macro cell radios are determined based on having a coverage area overlap with an intended coverage area of the small cell radio that is strongest among the surrounding macro cell radios or that have a strongest coverage area that is near the intended coverage area of the small cell radio. In some instances, determining the one or more dominant macro cells can be based on at least one of: a geographical location of the small cell radio and one or more macro cell radios surrounding the small cell radio; a network listen performed by the small cell radio; a re-selection history of the UE; and a handover history of the UE.

In some instances, the adjusting can include reducing the transmit power of the small cell radio when the presence of all of the UE is determined to be outside the surrounding macro cell coverage area. In other instances, the adjusting can include increasing the transmit power from a reduced transmit power when the presence of the UE is determined to enter the surrounding macro cell coverage area from an area outside the surrounding macro cell coverage area.

In other cases, determining whether the UE is allowed service on a small cell radio located in a vicinity of a macro cell coverage area of a selected macro cell radio can further include: determining whether one or more small cell radios are in the vicinity of the macro cell coverage area of the selected macro cell radio; recovering an International Mobile Subscriber Identity (IMSI) for the UE; and determining whether the IMSI of the UE is included in a corresponding whitelist for any of the one or more small cell radios in the vicinity of the macro cell coverage area of the selected macro cell radio. In some instances, the both methods can be performed, at least in part using a self-organizing network (SON) management system configured to interface with one or more of a small network, a wireless local area network and a macro network.

Example Embodiments

Turning to FIG. 1, FIG. 1 is a simplified block diagram illustrating a communication system 100 to facilitate managing interference in a network environment based on user presence according to one embodiment of the present disclosure. This particular configuration may be tied to the 3rd Generation Partnership Project (3GPP) 3G architecture for Evolved Packet System (EPS) architecture, also sometimes referred to as the Long Term Evolution (LTE) EPS architecture. Alternatively, the depicted architecture may be applicable to other environments equally.

The example architecture of FIG. 1 may include users operating user equipment (UE) 110a-110c within a radio access network (RAN) 112, a service network 114, a mobile core network 116, a self-organizing network (SON) management system 180 and a whitelist service 182 within communication system 100. RAN 112 can include one or more small cell radio access points (APs) 130a-130b, one or more wireless radio APs 160a-160c and one or more macro cell radios 170a-170b. Each small cell radio AP 130a-130b can have a logical connection to a small cell gateway 134 and a small cell management system 136 via service network 114. Each wireless radio AP 160a-160c can have a logical connection to a wireless local area network (LAN) controller 162 via service network 114. Wireless LAN (WLAN) controller 162 may have a logical connection to a wireless LAN (WLAN) access gateway (AGW) 164, which may have a logical connection to mobile core network 116. Each macro cell radio 170a-170b may have a logical connection to mobile core network 116. Small cell management system 136 can include an interference control module 140a and SON management system 180 can include an interference control module 140b.

In various embodiments, SON management system 180 and/or whitelist service 182, depending on configuration by a network operator and/or service provider, can have one or more logical connections to any of small cell radio APs 130a-130b, wireless radio APs 160a-160c, macro cell radios 170a-170b, small cell gateway 134, small cell management system 136, wireless LAN controller 162 and/or wireless LAN access gateway 164 via mobile core network 116 and/or service network 114. Thus, SON management system 180 can interface with any of small cell radio APs 130a-130b, wireless radio APs 160a-160c, macro cell radios 170a-170b, small cell gateway 134, small cell management system 136, wireless LAN controller 162 and/or wireless LAN access gateway 164 via mobile core network 116 and/or service network 114 to facilitate various interference management functions and/or operations as described herein.

As shown in FIG. 1, small cell radio AP 130a may provide a small cell coverage area 132a, small cell radio AP 130b may provide a small cell coverage area 132b and macro cell radio 170a may provide a macro cell coverage area 172a, each of which may provide for cellular/mobile coverage for UE 110a-110c. Although not illustrates, macro cell radio 170b can also provide an associated macro cell coverage area. Each wireless radio AP 160a-160c may also provide a respective WLAN coverage area, although these are not shown in FIG. 1 for ease of illustration. In various embodiments, depending on deployment location, small cell coverage areas for each of small cell radio APs 130a-130b may overlap with each other as well as with the macro cell coverage areas for macro cell radios 170a-170b as well as with the WLAN coverage areas for wireless radio APs 160a-160c. In various embodiments, as discussed in further detail herein, small cell coverage areas 132a-132b for respective small cell radio APs 130a-130b can be varied (as shown by arrows for each coverage area 132a-132b) to manage interference between the small cell radios and/or the macro cell radios by adjusting transmission power of the small cell radios (e.g., reducing or turning off transmissions) based, at least in part, on UE presence.

Note that small cell radio APs 130a-130b, small cell gateway 134 and small cell management system 136 can collectively be referred to interchangeably herein as a 'small cell layer', a 'small cell system' or a 'small cell network'. Note also that wireless radio APs 160a-160c, wireless LAN controller 162 and wireless LAN AGW 164 can collectively be referred to interchangeably herein as a 'WLAN layer' or a 'WLAN system'. Note further that macro cell radios 170a-170b and mobile core network 116 can collectively be referred to herein as a 'macro layer', a 'macro cell network' or a 'macro network'. As the coverage areas for each of the networks (e.g., macro, small cell, WLAN) can overlap, neighbor and/or surround each other, these networks can be referenced in relation to each other using the terms 'parallel networks' or 'parallel layers' herein in this Specification.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

RAN 112 is a communications interface between UE 110a-110c, service network 114 and mobile core network 116. In various embodiments, RAN 112 may include 3GPP access networks such as, for example, Global System for Mobile Communications (GSM) Enhanced Data Rates for GSM Evolution (EDGE) Radio Access Network (GERAN), generally referred to as 2G, and Universal Mobile Telecommunications System (UMTS) Terrestrial Radio Access Network (UTRAN), generally referred to as 3G, and/or evolved UTRAN (E-UTRAN), generally referred to as 4G, Long Term Evolution (LTE) or LTE-Advanced (LTE-A). In various embodiments, RAN 112 may include non-3GPP IP access networks such as digital subscriber line (DSL), Cable, WLAN (e.g., Wireless Fidelity (WiFi), Worldwide Interoperability for Microwave Access (WiMAX)) or the Internet.

In various embodiments, service network 114 can represent a series of points or nodes of interconnected communication paths (wired or wireless) for receiving and transmitting packets of information that propagate through communication system 100 via small cell radio APs 130a-130b and/or wireless radio APs 160a-160c. In various embodiments, service network can be associated with and/or provided by a single network operator or service provider and/or multiple network operators or service providers. In various embodiments, service network 114 can include and/or overlap with, in whole or in part, one or more packet data networks, such as, for example, the Internet. Service network 114 may offer communicative interfaces between various elements of communication system 100 and may be any local area network (LAN), wireless local area network (WLAN), metropolitan area network (MAN), wide area network (WAN), virtual private network (VPN), Radio Access Network (RAN), enterprise network, Intranet, extranet, or any other appropriate architecture or system that facilitates communications in a network environment. In various embodiments, service network 114 may implement user datagram UDP/IP connections and TCP/IP communication language protocol in particular embodiments of the present disclosure. However, communication network may alternatively implement any other suitable communication protocol for transmitting and receiving data packets within communication system 100. In various embodiments, service network 114 can be multiple networks interconnected via one or more network appliances, elements, gateways, etc.

Mobile core network 116 may include other network appliances, elements, gateways, etc. that may make up an Evolved Packet Core (EPC) for 4G services, 2G and 3G architectures for General Packet Radio Service (GPRS), Circuit Switched (CS) services and Packet Switched (PS) services as provided in 3GPP specifications, including, for example, Technical Specification (TS) 23.401, etc. In various embodiments, mobile core network 116 may include elements, gateways, etc. to provide various UE services and/or functions, such as, for example, to implement Quality-of-Service (QoS) on packet flows, to provide connectivity for UE 110a-110c to external data packet networks (PDNs), to provision CS voice routing, to provide enhanced services such as enhanced charging, stateful firewalls and/or traffic performance optimization (TPO), etc.

In various embodiments, UE 110a-110c are mobile devices having multi-mode communication capabilities and are able to simultaneously communicate with one or macro cell radio(s) 170a-170b or one or more small cell radio APs 130a-130b using one or more internal cellular radios capable of mobile cellular connections such as 4G/LTE, 3G, etc. connections and communicate with one or more wireless radio APs 160a-160c using one or more internal wireless radios capable of wireless LAN access connections such as WiFi connections and/or Worldwide Interoperability for Microwave Access (WiMAX) connections. In various embodiments, UE 110a-110c can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 110a-110c may also be inclusive of a suitable interface to a human user such as a microphone, a display, a keyboard, or other terminal equipment. As used herein in this Specification, the terms 'user' and 'subscriber' may be used interchangeably.

UE 110a-110c may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 110a-110c may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

In general, macro cell radios 170a-170b can offer suitable connectivity to one or more UE (e.g., UE 110a-110c) via respective coverage areas (e.g., coverage area 172a, as shown for macro cell radio 170a) for one or more radio access networks (e.g., 4G/LTE, 3G, 2G) using any appropriate protocol or technique. For 4G/LTE deployments, macro cell radios 170a-170b can represent evolved Node Bs (interchangeably referred to as eNodeBs or eNBs) and for 2G/3G deployments macro cell radios 170a-170b can represent Node Bs (interchangeably referred to as NodeBs or NBs).

In general, eNodeBs can be responsible for selecting a Mobility Management Entity (MME) (not shown) within mobile core network 116 for session establishment for each UE 110a-110c, for managing radio resources for each UE 110a-110c, and making handover decisions for UEs, for example, handover to other eNodeBs and/or small cell radio APs. In general, a NodeB can be deployed in combination with a Radio Network Controller (RNC), which can be included within or separate from NodeB equipment. The combination of NodeB/RNC can perform similar functions as an eNodeB within 2G/3G deployments. In various embodiments for 3G deployments, an RNC 174 can be provided in communication system 100 to serve macro cell radios 170a-170b each having NodeB capabilities.

In general, small cell radio APs 130a-130b can offer suitable connectivity to one or more UE (e.g., UE 110a-110c) via respective coverage areas 132a-132b for one or more radio access networks using any appropriate protocol or technique. For 4G/LTE deployments, small cell radio APs 130a-130b can represent Home evolved Node Bs (HeNBs) and for 2G/3G deployments, small cell radio APs 130a-130b can represent to as Home Node Bs (HNBs). In various embodiments, small cell radio APs 130a-130b can be dual stack radio AP devices, configured to provide both 4G/LTE and WiFi connectivity or can be triple stack radio AP devices, configured to provide 4G/LTE, 3G/2G and WiFi connectivity. Thus, in general terms, small radio APs 130a-130b can represent radio access point devices that can allow UEs to connect to a wired network using WiFi, Bluetooth™, WiMAX, 2G, 3G, 4G or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (WLAN), an HNB, an HeNB or any other suitable access device, which may be capable of providing suitable connectivity to a given UE. In certain cases, the access point can connect to a router (via a wired network), which can relay data between the UE and other UE of the network. Note as referred to herein in this Specification a small cell radio AP (e.g., small cell radio APs 130a-130b) may also be referred to interchangeably as an 'HNB', an 'HeNB', a 'small cell', a 'small cell access point', a 'femtocell', a 'femto' or a 'picocell'.

Small cell gateway 134 may aggregate connectivity of small cell radio APs 130a-130b to mobile core network 116. In various embodiments, small cell management system 136 may be used to provision small cell radio APs 130a-130b according to one or more management protocols and/or data models. For example, small cell management system 136 can provision small cell radio APs 130a-130b according to technical report 069 (TR-069) protocol using the TR-196 version 2 data model, in certain embodiments. In certain embodiments, small cell radio APs 130a-130b can be deployed in business (e.g., enterprise) environments within predefined clusters or grids that can be optimized to provide contiguous or overlapping cellular/mobile coverage for enterprise users (e.g., employees, visitors, etc.) when such users are located within a coverage area of small cell radio APs deployed in such a cluster/grid.

In various embodiments, small cell management system 136 can also be used to configure or manage grid or cluster information for groups of small cell radio APs including, but not limited to, configuring grid/cluster identities (IDs) for different grids/clusters, configuring cell IDs for small cell radio APs (e.g., local or global), configuring physical layer identifiers (e.g., primary scrambling code (PSC), physical cell identity (PCI)), configuring location area code (LAC), routing area code (RAC), tracking area code (TAC) for small cell radio APs, combinations thereof or the like. Small cell management system 136 can further include interference control module 140a, which can be used to manage interference of small cell radio APs 130a-130b using various techniques, such as for example, controlling transmission power for the small cell radio APs, as discussed in further detail herein.

Each wireless radio AP 160a, 160b, 160c can offer suitable WLAN connectivity to one or more UE (e.g., UE 110a-110c) via respective coverage areas using any appropriate protocol or technique (e.g., WiFi, WiMAX). Each wireless radio AP 160a, 160b, 160c may be in further communication with wireless LAN controller 162, which may be responsible for system wide wireless LAN functions, such as security policies, intrusion prevention, RF management, QoS, and mobility. Wireless LAN controller 162 may be in further communication with wireless LAN access gateway 164, which may provide connectivity to one or more packet data networks for UE 110a-110c via mobile core network 116. In various embodiments, wireless LAN access gateway 164 may be implemented as a 'SaMOG' access gateway. 3GPP standards, such as, for example, Release 11 (Rel-11), define interworking between a WLAN and LTE access systems (e.g., mobile core network 116) for S2a Mobility based on GPRS tunneling protocol (GTP), generally referred to using the term 'SaMOG'.

SON management system 180 can further include interference control module 140b, which can be used to manage interference of small cell radio APs 130a, 130b using various techniques, such as for example, controlling transmission power for the small cell radio APs based, at least in part, on UE presence, as discussed in further detail herein. In various embodiments, SON management system 180 can be configured to monitor and optimize resources for multiple parallel communication layers within communication system 100 including, but not limited to: a macro cell layer including, for example, macro cell radios 170a-170; a small cell layer including, for example, small radio APs 130a-130b; and a WLAN layer including for example, wireless radio APs 160a-160c. SON management system 180 can be configured to interface with any element or node of communication system 100 via one or more logical interfaces. In essence, SON management system 180 has a system-wide view of communication system 100 and can therefore intelligently provision resources among communication layers in the communication system. In various embodiments, SON management system 180 can be deployed within mobile core network 116 or a within cloud-based service (e.g., in a centralized SON (cSON) architecture) or can be deployed across service network 114 and mobile core network 116 (e.g., in a distributed SON (dSON) architecture).

In various embodiments, small cell radio APs 130a-130b can be configured in a Closed access mode or Hybrid access mode. For a Closed access mode deployment, users who are not included on an authorization list (e.g., whitelist, enterprise directory list, directory list, etc.) for a small cell radio AP cannot consume resources for the small cell radio AP (e.g., cannot attach to the small cell radio AP). For a Hybrid access mode deployment, a given small cell radio AP can be deployed having a partially Closed access mode (e.g., reserving certain resources, bandwidth, etc. for whitelisted users) and a partially Open access mode (e.g., providing certain resources, bandwidth, etc. for non-whitelisted users). In various embodiments, whitelist service 184 may be configured to provide whitelist services to one or more small cell radio APs deployed in communication system 100.

In at least one embodiment, small cell gateway 134 can determine whitelist entries for small cell radio APs 130a-130b using a (Remote Authentication Dial In User Service (RADIUS) Access-Request. During operation, each small cell radio AP 130a-130b that may be deployed in a full/partial Closed access mode can query its internal whitelist using an International Mobile Subscriber Identity (IMSI) of a user associated with a given UE (e.g., UE 110a-110c) to determine if the user can attach to the small cell radio AP. In various embodiments, whitelist service 182 can be included within an Authentication, Authorization and Accounting (AAA) service/server or can be separate from such a service/server. In certain embodiments, whitelist service 182 can be configured in residential environments (e.g., identifying users, residents, etc. capable of accessing one or more small cell radio APs in a home, apartment, etc.) or in commercial or enterprise environments (e.g., identifying users, employees, guests, etc. capable of accessing one or more small cell radio APs in an office, building, set of buildings, etc.). In various embodiments, whitelist service 182 may be deployed within mobile core network 116, within service network 114 and/or distributed across mobile core network 116 and service network 114.

Before detailing some of the operational aspects of FIG. 1, it is important to understand common characteristics of interference, which can occur between small cell and macro cell networks. The following foundation is offered earnestly for teaching purposes only and, therefore should not be construed in any way to limit the broad teachings of the present disclosure.

In many network architectures, small cell radio APs can be deployed as autonomous units to improve reception in areas with poor coverage, within buildings where coverage is reduced by the structure itself, or to offload usage from macro cell networks. Essentially, small cell radio APs are fully featured base stations that can provide proximate coverage in a business (e.g., enterprise) and/or residential environment. Typically, small cell radio APs operate at lower radio power levels as compared to macro cell radios. Calls can be made and received, where the signals are sent (potentially encrypted) from small cell radio AP via a service network (e.g., service network 114) to one of the service provider's main switching centers. Small cell radio APs can be provisioned to readily handle 8, 16, 32, etc. concurrent calls. Thus, a small cell radio AP generally operates as a mini tower for a proximate user.

An increasing density of residential small cell deployments is raising alarms with service providers about cumulative effect on downlink (DL) interference outside of residential complexes. Most residential small cells are idle during the day when users are away. However, they continue to generate downlink (DL) pollution with their ongoing common pilot channel (CPICH) broadcasts. In a similar manner, small cells in an enterprise environment may support more users during different periods of the day (e.g., day vs. night) and/or on different days of the week (e.g., weekends, holidays, etc.). In many urban environments, business hours are exactly the time when most activity occurs outside the residence. Because of the decreased coverage area of small cells, the peak-to-mean in terms of throughput and number of supported users on a single small cell radio AP are set to increase.

This means that for long periods, small cells (e.g., either within business or residential environments) may have no associated UEs within their coverage area. In these situations, the small cell is effectively an interference source, degrading the performance of the macro network with no appreciable benefit since the small cell isn't offloading any traffic. Accordingly, it would be desirable to eliminate small cell interference when they are not used indoors by turning them off or reducing their power considerably.

Within the industry, there exists a desire to automate the power control of small cells to limit their interference to the macro network. However, a problem exists in defining an approach that enables limiting the interference to surrounding macro cell(s) (e.g., surrounding macro cells) using automated SON techniques. A simple approach is a time-of-day based power control, but this is too crude. A residential unit that has its power decreased during the day will inhibit the service provided to home workers and other family members. An office unit that has its power decreased in the evening will disadvantage late night workers.

In accordance with one embodiment, communication system 100 can provide a system and method for providing an automated technique for reducing interference effects of small cell systems and improving the performance and energy consumption of such systems. In various embodiments, the system and method can increase the overall system key performance indicators (KPIs) for networks in which small cells are deployed. In essence, the system and method automates the common channel power control of small cell radio APs according to the presence of UEs attached to the small cell system. In various embodiments, the automated common channel power control (also referred to herein using the terms 'adaptive power control' or 'automated interference control') can be applied to all small cell radio APs within a given small cell system or particular small cell radio APs within the system, as the presence of users within the system and/or within different locations of the system may fluctuate. The methods described herein may be executed by respective hardware processors of small cell management system 136 and/or SON management system 180, among other elements/nodes within communication system 100.

In certain embodiments, the system and method provided by communication system 100 can determine UE presence based, at least in part, on UE location updates that can be received from UE within the small cell system. Indoor small cell systems are normally deployed with a location/routing/tracking area code that is distinct from the surrounding macro and hence a location update procedure will be triggered when a UE reselects a cell corresponding to the small cell using, for example, a location area update (LAU) procedure, a routing area update (RAU) procedure or a tracking area update (TAU) procedure. Using the location update procedure(s), the small cell network is then operable to determine when UEs (e.g., any of UE 110a-110c) are attached to it.

In a particular embodiment, small cell management system 136 can be enhanced with interference controlling capabilities (e.g., via interference control module 140a) operable to signal to the small cell system (e.g., small cell radio APs 130a and/or 130b) one or more parameters related to automated interference control for the small cell system. In various embodiments, the parameters related to automated interference control can be associated with power control of common channels for small cell radio APs 130a and/or 130b. The automated interference control can be referred to herein as an interference limiting mode, in which the small cell system is capable of operating to reduce interference with any nearby macro layers. In various embodiments, the interference limiting mode may also provide reduced energy consumption for the small cell system and, therefore, may also be considered an energy savings mode.

In certain embodiments, each of small cell radio APs 130a-130b can be configured to transmit at a normal power ($P_{NORMAL}$) Decibel-milliwatts (dBm). Upon determining that a last UE has left the small cell system, small cell management system 136 can perform one or more periodic checks to determine whether any UEs have re-entered the small cell system (e.g., re-entered a coverage area for a particular small cell radio AP or re-entered a coverage area for a cluster/grid of small cell radio APs). After each periodic check, if no UE is determined to be present in the small cell system, small cell management system 136 can reduce the transmit power for one or more small cell radio APs (e.g., small cell radio AP 130a and/or 130b) of the small cell system.

One or more timers can be configured via small cell management system 136 and can be used to trigger the periodic checks for UE presence in the small cell system. In various embodiments, the one or more timers can be based on known periodic timers defined to trigger LAU/RAU/TAU procedures, such as, for example, a T3212 time of periodic location update (TPLU) timer as defined by various 3GPP standards or can be set to one or more predetermined time periods as configured by a network operator and/or service provider.

Consider an operational example in which a first timer T1, a second timer T2, a first transmit power reduction level P1 dBm and a second transmit power reduction level P2 are configured by small cell management system 136. During operation, for example, when a last UE is determined to have left the small cell system (e.g., T3212 for the UE has expired and no LAU/RAU/TAU has been detected for the last UE that was in the system), small cell management system 136 can trigger one or more operations associated with the interference limiting mode for the small cell system. For example, the first timer T1 can be started. If the first timer T1 expires and the small cell system is still 'idle' (e.g., having no supported UEs connected to the system), then the common channel transmit power for one or more small cell radio APs (e.g., small cell radio APs 130a and/or 130b) can be reduced to ($P_{NORMAL}$-P1) dBm.

When the power is reduced, the second timer T2 is started. When the second timer T2 expires, if the small cell system remains idle, the common channel transmit powers can be reduced a further P2 dBm and the second timer T2 can be restarted. The operation can continue until the transmit power of the common channels is reduced below a defined low threshold transmit power (e.g., $P_{LOWTHRESH}$) which can be configured by small cell management system to be the lowest transmit power for the common channels.

In various embodiments, the small cell system is also operable to detect when a UE attaches to the system. Detecting that a UE attaches to the small cell system can be used by small cell management system 136 to immediately revert to "normal" operation, e.g., transmitting the common channels at $P_{NORMAL}$ dBm from a reduced transmit power. In a particular embodiment, a distinct location/routing/tracking area code assigned to the small cell system can trigger UEs to initiate a LAU/RAU/TAU when reselecting a cell of the small cell system that may be operating in an interference limiting mode. The LAU/RAU/TAU procedure can be used to return the small cell system to its normalized operating conditions.

Accordingly, providing adaptive power control of small cell APs 130a and/or 130b in an interference limiting mode will effectively move the coverage area and rove-in boundary/effective coverage area of the small cell radio APs 130a and/or 130b (e.g., the boundary/coverage area in which UEs will seek to attach to the small cell radio APs) within a building, office complex, etc. as the small cell radio AP(s) reduce the transmitted power of their common channels. Accordingly, the system and method provided by communication system 100 can help to ensure that no outside users are adversely affected by the small cell system and can reduce interference to any surrounding macro cell networks. In certain embodiments, only when a user crosses the rove-in boundary within the building, office complex, etc. will the user's UE trigger a LAU/RAU/TAU procedure, thus triggering the small cell system to revert to its normal operation.

In some cases (e.g., different deployment scenarios), the effective coverage area of a given small cell radio AP (e.g., respective coverage areas 132a-132b for respective small cell radio APs 130a-130b) will be determined according to the sensed received power of the small cell (broadcasted pilot) by nearby UEs. Consider an operational example in which small cell radio AP 130a is operating in a separate frequency than the macro layer around it. In such a case, if the pilot power of the small cell radio AP is reduced by the interference/energy saving mode and doesn't remain above a threshold level that can be sensed by UE, then no UE will camp on the small cell (and no LAU/RAU/TAU will be made).

In certain embodiments, a method can be provided in which inferred triggering can be driven by SON management system 180 (e.g. deployed in a cSON architecture or dSON architecture), including interference control module 140b to determine UE presence based information gathered and/or received from one or more layers (e.g., networks) parallel to the small cell layer including, but not limited to the macro cell layer and the WLAN layer. In certain embodiments, SON management system 180 can be made aware via small cell management system 136 that the one or more small cell radio APs of the small cell network are operating in an interference limiting mode. Upon gaining such awareness, SON management system 180 can monitor UE presence near intended coverage areas of the one or more small cell radio APs using information gathered or received from one or more parallel networks.

In various embodiments, UE presence as determined via one or more parallel layers can be used to restore the pilot power back to a level corresponding to a maximum, an intended or a nominal coverage area for a given small cell radio AP and/or group of small cell radio APs in order for one or more UEs to attach to the small cell network. For example, during operation, SON management system 180 can determine UE presence near a potential coverage area for a given small cell radio AP (e.g., a maximum, an intended or nominal coverage area for the small cell radio AP at a maximum, a normal or a nominal transmit power level, respectively) and/or a group of small cell radio APs in the small cell network using UE presence information gathered and/or received from one or more parallel network layers to restore the pilot power to $P_{NORMAL}$ to restore the coverage area for the small cell radio AP(s).

In various embodiments, a maximum or intended coverage area for a given small cell radio AP can correspond to the coverage that that the small cell radio AP can provide at a maximum or intended transmit power, respectively, and a nominal coverage area can correspond to the coverage that the small cell radio AP can provide at a nominal transmit power (e.g., some reduced transmit power). In various embodiments, intended and/or nominal transmit power can be configured by a network operator/service provider to a level less than maximum transmit power, which may provide sufficient coverage for the small cell radio AP (or group of small cell radio APs) optimized for the deployment environment of the small cell radio AP (or group of small cell radio APs) and/or for load balancing between small cells radio APs of the small cell system. For example, the intended coverage area can be optimized to account for intra-small cell network interference, inter-cell network interference, network load, power consumption, combinations thereof or the like.

In various embodiments, UE presence as determined via one or more parallel networks can also be used to reduce transmit power for a given small cell radio AP and/or group of small cell radio APs to avoid interference (e.g., for shared carriers) and/or completely turn off the radio for the small cell radio AP/group to avoid power usage (e.g., for separate carriers). In certain embodiments, UE presence can be determined via the macro cell network and/or WLAN in order to reduce and/or completely turn off one or more small cell radio APs using the timer-based methods discussed above. It should be understood that other methods for reducing and/or turning off small cell radio APs can be used based on UE presence determined via one or more parallel networks.

Moreover, in various embodiments, SON management system 180 can be configured with location information pertaining to the deployment locations of small cell radio APs 130a-130b and/or their respective coverage areas 132a-132b as well as the deployment locations of wireless radio APs 160a-160c and/or their respective coverage areas 162a-162c as deployed within communication system 100. In various embodiments, such location information can be represented using Global Positioning System (GPS) coordinates, landmark identifiers (e.g., for an office complex, for example, identifiers can include room numbers, names, etc.), combinations thereof or the like.

In certain embodiments, location information for the small cell system and the WLAN system can also be configured to identify various proximity relationships between various small cell radio APs and wireless radio APs such as, for example, which wireless radio APs may be near and/or within a coverage area or potential/intended coverage area of one or more corresponding small cell radio APs. In various embodiments, SON management system 180, via interference control module 140b, can use the configured location information for the small cell system and the WLAN system to coordinate interference control for one or more small cell radio APs of the small cell system using UE presence information gathered or received from these systems.

In certain embodiments, SON management system 180 can also be configured with location information pertaining to the locations of macro cell radios 170a-170b and/or their respective coverage areas (e.g., coverage area 172a for macro cell radio 170a) as well as various relationships between one or more small cell radio APs and one or more macro cell radios.

In one or more embodiments, information gathered or received via the macro cell layer and/or WLAN layer related to UE presence can include, but not be limited to: monitoring cell level statistics, performing basic triangulation techniques (e.g., received signal strength indication (RSSI), time difference of arrival (TDOA), etc.) and/or monitoring geolocation events collected in near real time (NRT) timescales. In certain embodiments, SON management system 180 may also identify traffic build-up in one or more layers parallel to the potential/intended coverage area of a small cell radio AP and/or group of small cell radio APs in order to accelerate the kickback of transmit power to nominal coverage levels. For example, SON management system 180 may be configured with a build-up threshold value, which can be used to indicate a number of UEs for which, when the presence of UEs near one or more small cell radio APs reaches the threshold value, SON management system 180 can revert the small cell radio APs back to a maximum, normal or nominal coverage area, which may allow the UEs to connect to the small cell system.

For the WLAN layer, UE presence can be determined in certain embodiments based on UEs being connected to wireless radio APs (e.g., wireless radio APs 160a-160c) and/or using a WLAN service. However, UE presence can also be determined in certain embodiments without UEs needing to connect to a wireless radio AP or ever using a WLAN service. For example, WLAN controller 162 can be configured with an International Mobile Subscriber Identity (IMSI) to Media Access Control (MAC) mapping, referred to herein as an 'IMSI-to-MAC' mapping, which can be used to associate IMSIs of users associated with UEs (e.g., UEs 110a-110c) to the corresponding MAC addresses of the UEs.

Once an IMSI-to-MAC mapping for a particular user/UE combination (e.g., say, for example, for UE 110b) is stored in the WLAN system, determining UE 110b presence (e.g., location) within the wireless system may not require the UE to be attached to or have an active session established with a particular wireless radio AP. Rather UE 110b may merely be in communication with one or more wireless radio AP through one or more wireless beacons that may be transmitted by the UE. During operation, UE 110b may transmit wireless beacons, which may be intercepted by one or more wireless radio APs 160a-160c. The beacons may include the MAC address of the UE. The wireless radio APs may, in turn, communicate such information to WLAN controller 162. Using the beacons, WLAN controller 162 can determine the user IMSI based on the previously registered IMSI-to-MAC mapping stored in WLAN controller 162. In certain embodiments, WLAN controller 162 can be configured with or can be in communication with a wireless LAN location engine, which can be used to determine the location of the UE using one or more location techniques such as, for example, RSSI measurements, TDOA measurements, etc. collected from one or more wireless radio APs receiving beacons from the UE in order to triangulate the location of the UE.

In certain embodiments, the IMSI-to-MAC mapping can be included within WLAN controller 162 or can be provided in a database external to WLAN controller 162. In some embodiments, an IMSI-to-MAC mapping may be provided using an authentication and authorization procedure to used to register a particular user in the WLAN system (e.g., via an AAA service/server). Authentication generally refers to the process where an entity's identity is authenticated, typically by providing evidence that it holds a specific digital identity such as an identifier and the corresponding credentials. Authorization is typically a process used to determine whether a particular entity is authorized to perform a given activity, typically inherited from authentication when logging on to an application or service. In certain embodiments, the WLAN system can support different authentication techniques including extensible authentication protocol subscriber identity module (EAP-SIM) authentication techniques and/or EAP authentication and key agreement (EAP-AKA) authentication techniques.

In some embodiments, network operator may provision the IMSI-to-MAC mappings for user/UE combinations for the WLAN system, which can allow registration via an authentication procedure to be bypassed. For example, in an enterprise deployment, a given enterprise operator may provision IMSI-to-MAC mappings for an enterprise WLAN system (e.g., identifying employees, contractors, vendors, customers, guests, etc.) that may be recognized in the WLAN system.

Accordingly, communication system 100 can reduce the impact of small cell deployments on macro cell networks by providing a system and methods to provide adaptive power control to one or more small cell radio APs 130a-130b based on UE presence within the small cell system.

Figure 2:
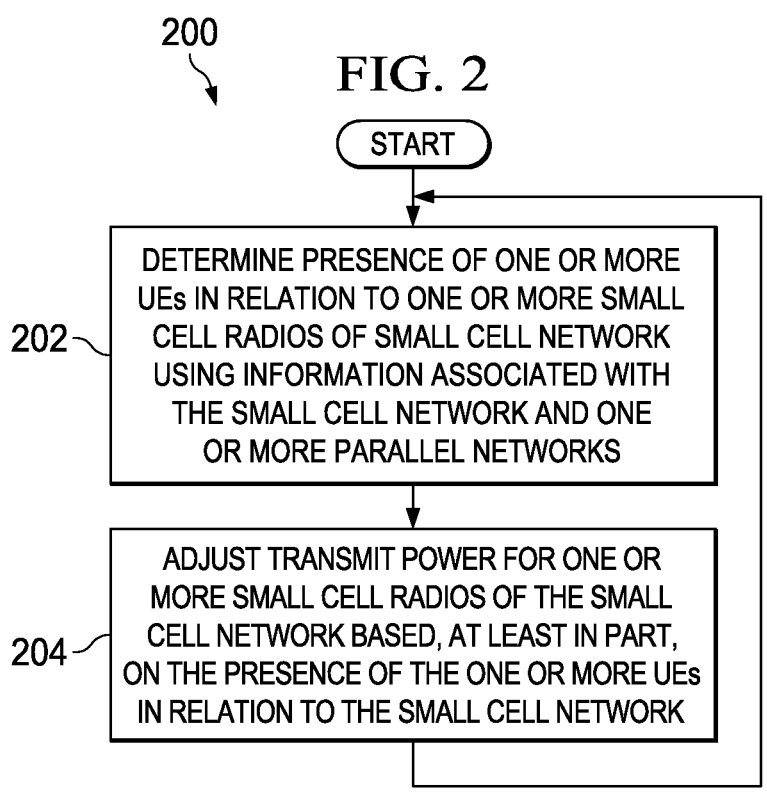
FIG. 2 is a simplified flow diagram illustrating example operations associated with managing interference in a network environment based on user presence in accordance with one potential embodiment of the communication system.

Turning to FIG. 2, FIG. 2 is a simplified flow diagram illustrating example operations 200 associated with managing cell interference in a network environment based on user presence in accordance with one potential embodiment of communication system 100. In various embodiments, operations 200 can be performed using any combination of hardware processors of small cell management system 136, SON management system 180, whitelist service 182, small cell gateway 134, wireless LAN controller 162 and/or wireless LAN access gateway 162 as well as any of small cell radio APs 130a-130b, wireless radio APs 160a-160c and/or macro cell radios 170a-170b.

At any time, UE presence within the small cell network can vary as users enter or exit the system. Accordingly, at 202 the operations include determining a presence of one or more UE (e.g., any of UE 110a, 110b and/or 110c) in relation to one or more small cell radios of the small cell network using UE presence information associated with the small cell network and one or more parallel networks. In certain embodiments, the one or more parallel networks can include, at least in part, a wireless local area network (WLAN).

In various embodiments, the UE presence information can be associated with location updates being received from one or more UE by the small cell network and/or the macro cell network. In various embodiments, the UE presence information can be associated with detecting one or more wireless beacons that can be transmitted by the one or more UE being received by one or more wireless radio APs (e.g., any of wireless radio APs 160a-160c) of the WLAN. In various embodiments, the UE presence information can be associated with UE presence in relation to one or more wireless radio APs (e.g., any of wireless radio APs 160a-160c) that may be near and/or within a potential/intended coverage area of one or more small cell radio APs (e.g., any of small cell radio APs 130a-130b). In certain embodiments, the UE presence information can be associated with a determination that a last UE has left a coverage area and/or potential/intended coverage area of one or more small cell radios. For example, a lack of location updates being detected in the small cell system can be indicative of no UEs being present in the system.

At 204, the operations can include adjusting transmit power for one or more small cell radios of the small cell network based, at least in part, on the presence of the one or more UEs in relation to the one or more small cell radios. In certain embodiments, the adjusting can include decreasing the transmit power of a given small cell radio (e.g., small cell radio AP 130a) based on a lack of UE presence within a coverage area of the small cell radio AP (e.g., coverage area 132a of small cell radio AP 130a) at the expiration of one or more timers configured via small cell management system 136 and interference control module 140a. In certain embodiments, the adjusting can include increasing the transmit power of the small cell radio based on presence of a given UE within the coverage area or the potential/intended coverage area (e.g., if the transmit power has been reduced from a normal or max transmit power) of the small cell radio. The operations can continue to determine UE presence within the small cell system and adjust the transmit power for one or more small cells during system operation as configured by a network operator and/or service provider.

Figure 3:
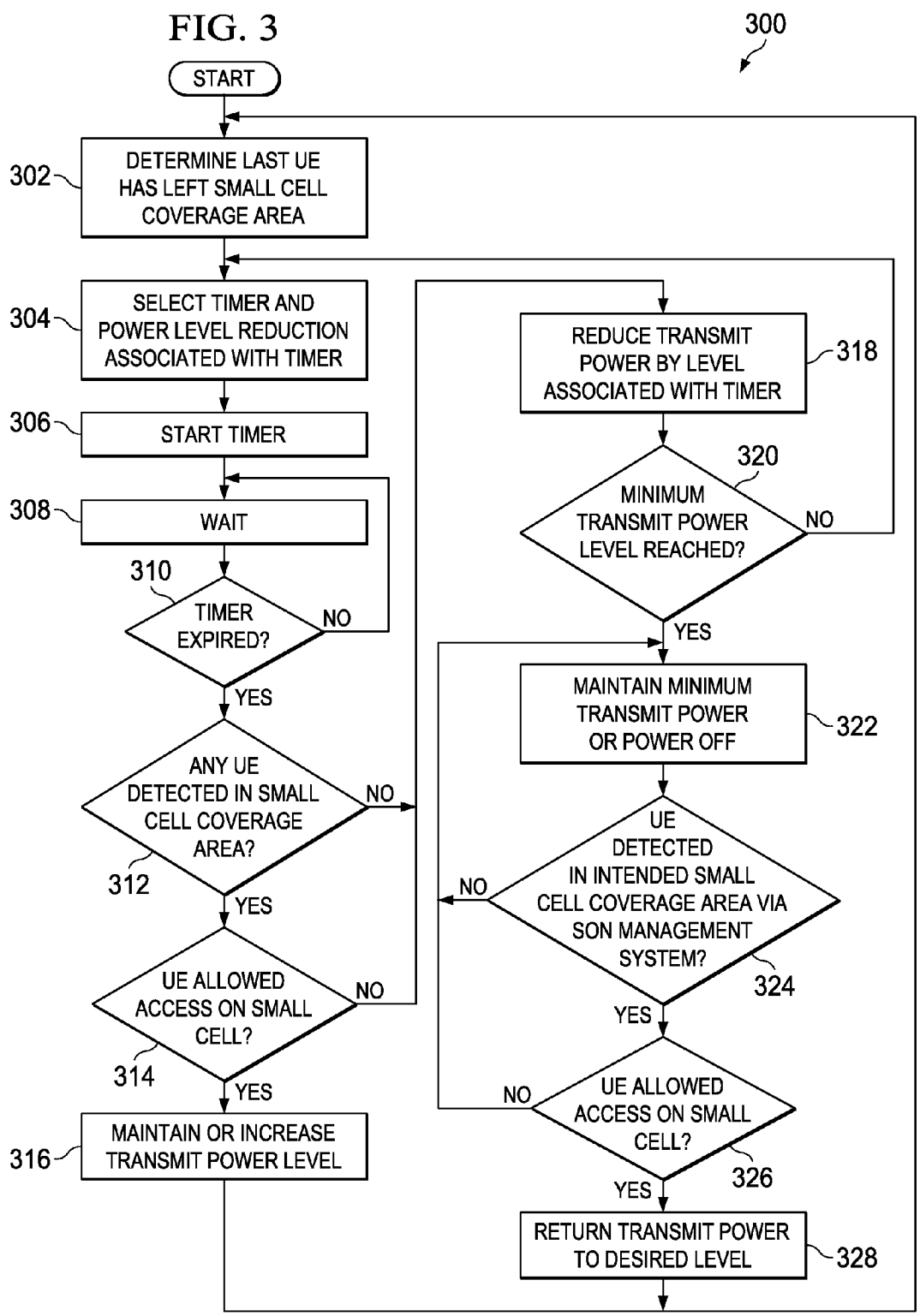
FIG. 3 is a simplified flow diagram illustrating other example operations associated with managing interference in a network environment based on user presence in accordance with one potential embodiment of the communication system.

Turning to FIG. 3, FIG. 3 is a simplified flow diagram other illustrating example operations 300 associated with managing interference in a network environment based on user presence in accordance with one potential embodiment of communication system 100. In various embodiments, operations 200 can be performed using any combination of hardware processors of small cell management system 136, SON management system 180, whitelist service 182, small cell gateway 134, wireless LAN controller 162 and/or wireless LAN access gateway 162 as well as any of small cell radio APs 130a-130b, wireless radio APs 160a-160c and/or macro cell radios 170a-170b. In general, the operations illustrate that transmit power for one or more small cell radio APs can be iteratively reduced through one or more loops of power reduction operations if no UEs are detected in a small cell coverage area until the transmit power for the one or more macro cell radios reaches a minimum transmit power threshold. Thereafter, UE presence within one or more parallel network layers (e.g., within the wireless LAN) can be detected via SON management system 180 in order to return the transmit power for the one or more small cell radio APs to a desired transmit power (e.g., maximum, normal or nominal) so that one or more UEs can connect to the small cell radio AP(s).

At any time, UE presence within the small cell network can vary as users enter or exit the system. Thus, the operations may begin at 302 in which small cell management system 136 determines that a last UE (e.g., UE 110a) has left a small cell coverage area. In various embodiments, the small cell coverage area can correspond to the coverage area of a given small cell radio AP and/or a cluster or grid of small cell radio APs (e.g., a last UE has left the coverage area for a small cell system consisting of a cluster or grid of small cell radio APs).

At 304, the operations can include selecting a timer and power level reduction associated with the timer. In various embodiments, multiple timers each having corresponding power level reductions can be configured for the interference management operations. In some embodiments, a first timer and corresponding first power reduction level can be selected to reduce the transmit power of the one or more small cell radio APs through a first iteration of the power reduction operations and a second timer and corresponding second power reduction level can be selected to reduce the transmit power of the one or more small cell radio APs through a second iteration of the power reduction operations.

At 306, the selected timer can be started and at 308 and 310 the operations can include waiting for expiration of the selected timer. Upon a determination that the selected timer has expired at 310, the operations can include determining at 312 if any UE is present within the small cell coverage area of the one or more small cell radio APs. In certain embodiments, UE presence within the coverage area of the one or more small cell radio APs can be determined if a given UE has sought to connect with a given small cell radio AP. In certain embodiments, UE presence can also be determined via SON management system 180, which can determine if one or more UE are within a potential coverage area (e.g., based on a maximum, a normal or a nominal transmit power for the one or more small cell radio APs. In various embodiments, SON management system 180 can use various location determination techniques (e.g., RSSI, TDOA triangulation, etc.) to determine a location of the detected UE(s). Based on the determined location, SON management system 180 can determine if the UE(s) is/are within a potential coverage area of the one or more small cell radio APs using location information configured for the small cell radio APs. It is assumed for purposes of the present example that SON management system 180 has been configured with functionality to determine if an intersection exists with respect to any detected UE location and the potential coverage area of the one or more small cell radio APs.

If any UE is detected in the small cell coverage area (e.g., actual or potential/intended coverage area) of the one or more small cell radio APs, the operations can continue to 314 in which a determination can be made as to whether the UE is allowed access on any of the one or more small cell radio APs that the UE is near. For example, in an enterprise deployment, the determination can include determining if the UE is allowed to access an enterprise small cell system. In some embodiments, if UE presence is determined via SON management system 180 through presence detected via one or more wireless UE beacons intercepted by wireless radio APs (e.g., any of wireless radio APs 160a-160c), determining if the UE(s) is/are allowed access on the one or more small cell radio APs can include retrieving an IMSI(s) for the user(s) associated with the UE(s) via a pre-configured IMSI-to-MAC mapping in which the MAC(s) of the UE(s) can be used to determine an IMSI(s) of the user(s). An IMSI for a given UE can then be used to perform a comparison with whitelists for the one or more small cell radio APs to determine if the UE is allowed access on any of the small cell radio APs. If however, UE presence is determined through the UE being connected to a given wireless radio AP, the IMSI of the user can be directly obtained and whitelist comparisons can be performed accordingly.

If it is determined that detected UE(s) is/are allowed access on one or more small cell radio APs that the UE(s) is/are near, the operations can include maintaining the transmit power for the one or more small cell radio APs or increasing the transmit power to a desired level at 316 and the operations can return to 302. If it is determined at 314, however, that the detected UE(s) is/are not allowed access on the one or more small cell radio APs, the operations can continue to 318 in which the transmit power for the one or more small cell radio APs can be reduced by the amount associated with the selected timer and the operations can continue as described herein.

For the operations at 312, if no UE is detected in the small cell coverage area (e.g., actual or potential/intended coverage area) of the one or more small cell radio APs the operations can also continue to 318 in which the in which the transmit power for the one or more small cell radio APs can be reduced by the amount associated with the selected timer. At 320, the operations can include determining if a minimum transmit power (e.g., $P_{LOWTHRESH}$) has been reached for the one or more small cell radio APs. In various embodiments, the minimum transmit power can be chosen by a network operator, service provider, combinations thereof or the like to reduce interference with one or more macro cells surrounding the one or small cell radio APs. If the minimum transmit power has not been reached, the operations can return to 304 in which a timer and a corresponding power reduction level associated with the timer can be selected and operations 306, 308, 310, 312, 314, and/or 316 can again be performed based on timer expiration and/or any UE being detected. The operations can continue in this manner until the minimum transmit power is reached. Accordingly, at 320, if it is determined that the minimum transmit power has been reached, the operations can include maintaining the minimum transmit power or powering off the transmitter of the one or more small cell radio APs at 322 to maintain the reduced interference with one or more macro cells surrounding the one or small cell radio APs.

At 324, the operations can include determining if UE presence has been detected in the intended small cell coverage area of the one or more small cell radio APs via SON management system 180. As noted, UE presence can be determined via SON management system 180 through presence detected from one or more wireless UE beacons intercepted via wireless radio APs (e.g., any of wireless radio APs 160a-160c). Using intercepted wireless beacons, SON management system 180 can, in various embodiments, use various location determination techniques (e.g., RSSI, TDOA triangulation, etc.) to determine a location of the detected UE(s). Based on the determined location, SON management system 180 can determine if the detected UE(s) is/are within a potential/intended coverage area of the one or more small cell radio APs using location information configured for the small cell radio APs.

If no UE presence is detected at 324, the operations can return to 322 in which the transmit power of the one or more small cell radio APs can be maintained at the minimum transmit power or maintained with their corresponding transmitters turned off to maintain the reduced interference with one or more macro cells surrounding the one or small cell radio APs.

If UE presence is detected at 324, the operations can continue to 326 in which a determination can be made as to whether the UE is allowed access on any of the one or more small cell radio APs. As noted previously, if UE presence is determined via interception of wireless beacons via one or more wireless radio APs, determining if the UE(s) is/are allowed access on the one or more small cell radio APs can include retrieving an IMSI(s) for the user(s) associated with the UE(s) via a pre-configured IMSI-to-MAC mapping in which the MAC(s) of the UE(s) can be used to determine an IMSI(s) of the user(s). An IMSI for a given UE can then be used to perform a comparison with whitelists for the one or more small cell radio APs to determine if the UE is allowed access on any of the small cell radio APs. If however, UE presence is determined through the UE being connected to a given wireless radio AP, the IMSI of the user can be directly obtained and whitelist comparisons can be performed accordingly.

If a detected UE is allowed access on the one or more small cell radio APs that it is near, the operations can continue to 328 in which the transmit power for the one or more small cell radio APs can be returned to a desired level (e.g., maximum, normal or nominal) depending on network operator and/or service provider configuration. If a detected UE is not allowed access on the one or more small cell radio APs that it is near, the operations can return to 322 in which the transmit power of the one or more small cell radio APs can be maintained at the minimum transmit power or maintained with their corresponding transmitters turned off.

It should be noted that the operations illustrated in FIG. 3 are provided for illustrative purposes only to illustrate one example set of operations that can be performed to determine UE presence via a small cell system and one or more parallel network layers and to adjust transmit power for one or more small cell radio APs of the small cell system. It should be understood that variations of the illustrated operations can be made within the scope of the present disclosure in order to provide interference management between a small cell system and one or more macro cells surrounding the small cell system.

Figure 4:
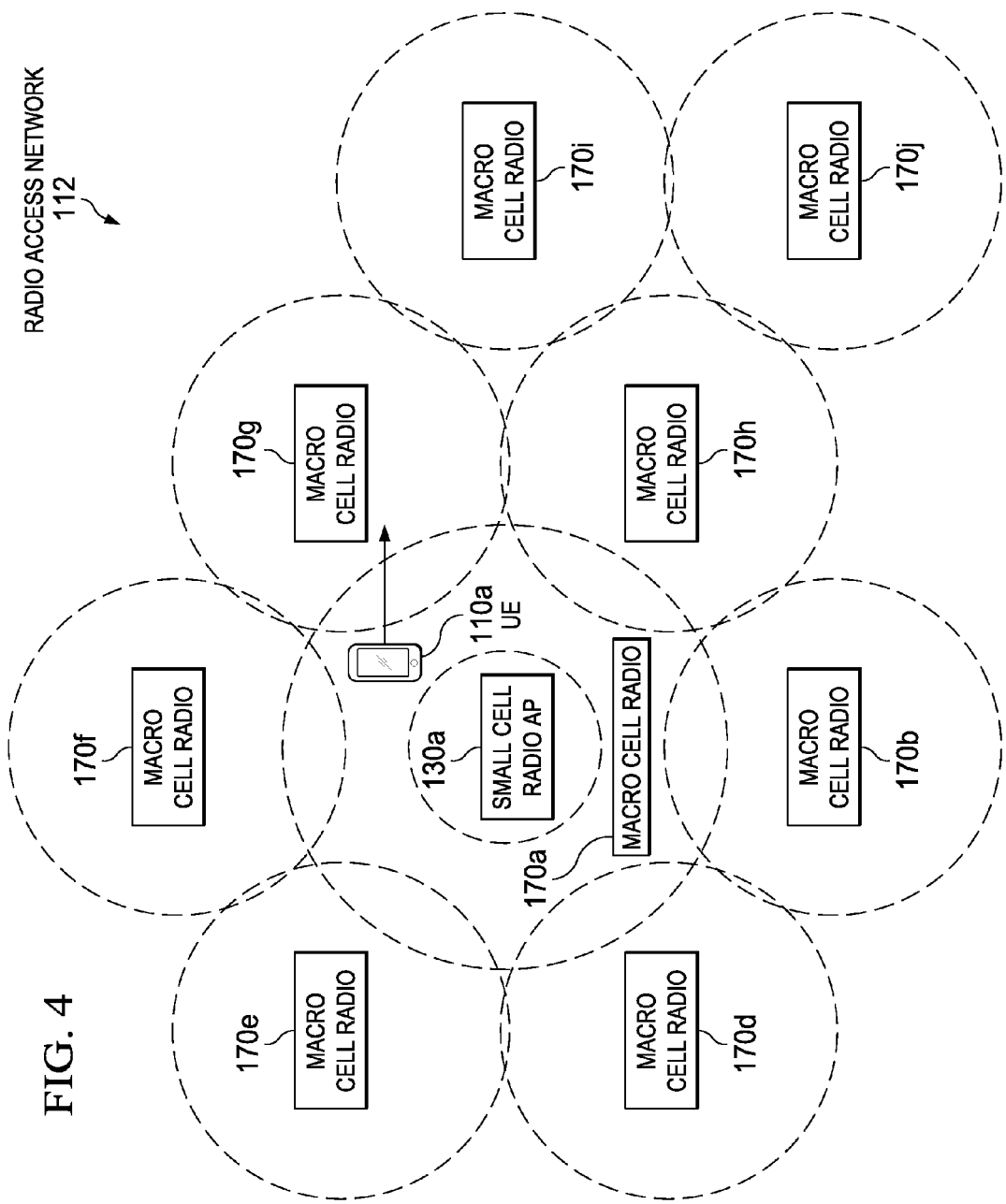
FIG. 4 is a simplified block diagram illustrating example details of a radio access network in accordance with one potential embodiment of the communication system.

Turning to FIG. 4, FIG. 4 is a simplified block diagram illustrating example details of an example configuration of radio access network (RAN) 112 that can be associated with communication system 100 in various embodiments. RAN 112 can include user equipment 110a, small cell radio AP 130a and macro cell radios 170a and 170b. RAN 112 can further include additional macro cell radios 170c-170j, which can be dispersed throughout RAN 112. Small cell radio AP 130a and macro cell radios 170a-170j can each provide respective coverage areas (dashed-line circles surrounding the respective radios) through which UEs (e.g., UE 110a) can seek to connect to respective radios. It should be understood that the organization of cell radios as well as their respective coverage areas as shown in FIG. 4 is provided for illustrative purposes only and is not meant to limit the broad scope of the teachings of the present disclosure. The cell radios and their respective coverage areas can be configured in a variety of configurations based on, for example, system design considerations of network operators and/or service providers.

In some embodiments, it may be desirable to deploy small cell networks and macro networks with support for 3G cellular paging channel (CELL_PCH) mode. This mode is an alternative to IDLE mode for UEs. CELL_PCH mode allows inactive UE to preserve Radio Resource Control (RRC) connection(s) and packet switched (PS) Radio Access Bearers (RABs) without using any dedicated radio resources. A UE in CELL_PCH mode can then be paged when the network needs to transition it to an active state.

Compared to IDLE mode, CELL_PCH mode can improve user experience by, for example saving approximately 2-4 seconds of setup time. It can also reduce CN signaling for RAB setup. UE battery use can also be reduced to near equivalent of IDLE mode usage depending on discontinuous reception (DRX) timers for paging. An additional benefit is the ability to track UE movement when in a non-active state (e.g., not engaged in a call, etc.) for location purposes because, in CELL_PCH mode, a given UE has to perform an RRC CELL UPDATE, as prescribed in 3GPP standards, whenever it measures a cell with a stronger signal than its current serving cell.

Say, for example, that UE 110a is transitioned to CELL_PCH mode while within the coverage area of macro cell radio 170a. When UE 110a, in CELL_PCH mode, moves to another macro cell radio within RAN 112, say, for example macro cell radio 170g, it will perform an RRC CELL UPDATE procedure. Macro cell radio 170g can then perform paging procedures for UE 110a as accustomed for CELL_PCH mode.

In accordance with various embodiments, communication system 100 can facilitate tracking the mobility of white-listed UEs in CELL_PCH mode through small cell and macro cell coverage to reduce interference between small cells and macro cells, particularly in residential environments. In essence, power control or automated interference control can be triggered to reduce power for a small cell radio AP when all white-listed users for the small cell radio AP have moved sufficiently far from the small cell radio AP and can be triggered to increase power back to a normal level when any of the white-listed users approaches the small cell radio AP.

For example, service for a residential small cell radio AP (e.g., small cell radio AP 130a) can be turned off and/or have its transmit power reduced when all white-listed users move sufficiently far from home. The radio (e.g., transmitter) can then be turned back on and/or transmit power can be increased when at least one user moves closer to the small cell. As a result, cumulative small cell downlink interference outside the home can be reduced at least during business hours when most home users are away at work.

During operation, for example, when a given UE (e.g., UE 110a) moves away from a dominant macro cell radio (e.g., macro cell radio 170a) surrounding a given small cell radio AP (e.g., small cell radio AP 130a), SON management system 180 via interference control module 140b can act to disable the small cell radio AP (e.g., turning the transmitter off but keeping the rest of the functionality for the small cell radio AP on), to place the small cell radio AP into a suspended sleep mode, reduce transmit power for the small cell radio, combinations thereof or the like. In certain embodiments, a suspended sleep mode for a small cell radio AP can include the small cell turning off its transmitter but periodically waking up to check for updates from small cell management system 136.

When the UE re-enters the coverage area for the macro cell radio that is known to be dominant around the small cell radio, SON management system 180 via interference control module 140b can act to turn on the small cell radio service to normal in anticipation of a possibility that a user is returning to a coverage area of the small cell radio. For example, in a residential use-case, the user could be returning home. In embodiments in which multiple white-listed users may be allowed to connect to a given small cell, only when all of them have moved away from the small cell radio's dominant macro cell radio area may the small cell radio be turned off and/or its transmit power can be reduced. When any single user enters the dominant macro cell coverage area, the small cell radio AP can be turned back on and/or have its transmit power increased.

In various embodiments, UE presence can be tracked via updates to SON management system 180 received from small cell gateway 134 serving small cell radio AP 130*a* and a given Radio Network Controller (RNC) (e.g., RNC 174) serving macro cell radio 170*a*. As noted, CELL_PCH mode in particular enables tracking UE movement as a given UE performs an RRC CELL UPDATE upon re-selecting the cell in a non-active mode. In certain embodiments, any activity from the UE (e.g., CS/PS activity) which establishes a new RRC Connection can also be used to track UE presence. In certain embodiments, it may also be possible to capture message on an Iub interface that may be configured between a macro NB (e.g., a macro cell radio deployed as a NB) and its corresponding serving RNC in case a macro RNC vendor does not wish to cooperate in managing small cell interference.

One or more dominant macro cell radios (and their corresponding coverage areas) can be identified (e.g., determined and/or estimated) for a given small cell radio AP using one or more techniques based on, for example, geographical knowledge of a given RAN and/or signaling history for a given UE. In general a dominant macro cell radio can be characterized as a macro cell which has a coverage area that has the strongest signal overlap in a vicinity (e.g., near and/or including) of the intended (e.g., maximum, normal or nominal) coverage area of a given small cell radio AP. Depending on deployment, a given small cell radio AP can be surrounded by multiple small cell radios. For example, as shown in FIG. 1, small cell radio AP 130*a* is surrounded by macro cell radios 170*a*-170*j*. The characterization of one or more of surrounding macro cell radios 170*a*-170*j* as a 'dominant' macro cell radio, however, can be varied according the desires of a network operator and/or service provider.

For example, in one embodiment, assuming UE 110*a* is allowed to connect to small cell radio AP 130*a* (e.g., included in a whitelist for small cell radio AP 130*a*), macro cell radio 170*a* could be determined or estimated as the dominant macro cell for small cell radio AP 130*a* in which case power control for small cell radio AP 130*a* could be triggered based on a lack of UE 110*a* presence within the coverage area for macro cell radio 170*a*. For example, if UE 110*a* in CELL_PCH mode moves to macro cell 170*g*, then power control for small cell radio AP 130*a* could be triggered. In another embodiment, for example, assuming UE 110*a* is allowed to connect to small cell radio AP 130*a*, macro cell radios 170*a*-170*h* could be determined as the dominant macro cells for small cell radio AP 130*a* in which case power control for small cell radio AP 130*a* could be triggered based on a lack of UE 110*a* presence within any of the coverage areas for macro cell radios 170*a*-170*h*.

Accordingly, any combination of macro cell radios can be identified as the dominant macro cell radios for a given small cell radio AP. In one embodiment, one or more macro cell radios can be identified as dominant for a given small cell radio AP based on macro and small cell geography, for example, the deployment location of the small cell and any surrounding macro cells. In certain embodiments, macro and small cell geography can be used in combination with results from macro drive tests in which macro cell signal strength can be measured at various locations within the coverage areas of one or more macro cells to determine one or more macro cell radios.

In still other embodiments, one or more dominant macro cell radios can be identified for a given small cell radio AP based on being the first macro cell radio to which a given UE (that is allowed access on the small cell radio AP) re-selects after being within a coverage area of the small cell radio AP. In some embodiments, re-selection history can be based on time and/or statistical aspects or re-selection, for example, determining the frequency of re-selection by the UE within a predetermined time window (e.g., hours, days, weeks, etc.). In some instances, however, re-selection history alone may not suffice as corner cases may emerge where re-selection of a 'dominant' macro cell may change dynamically due to changes in Ec/No (i.e., received energy per chip divided by the power density in the band), for example, due to uneven macro cell load. Accordingly, in yet other embodiments, a given small cell radio AP can perform one or more network listen (NWL) techniques (e.g., using a receiver of the small cell radio) and the results of the NWL can be used to identify a set of potentially dominant macro cell radios based on strongest signal or highest Ec/No.

In still other embodiments, handover history for a given UE (that is allowed access on a given small cell radio AP) can be used to determine one or more dominant macro cell radios for the small cell radio AP. In yet other embodiments, radio frequency (RF) propagation models including propagation data for a given small cell radio AP and one or more surrounding macro cells can be used to determine one or more macro cell radios of the small cell radio AP. These examples are only a few of the examples that could be used to determine dominant macro cell radios for a given small cell radio or a cluster or grid of small cell radios. It should be understood that any combination of the aforementioned techniques or any other similar techniques can be used to determine one or more dominant macro cell radios for one or more small cell radio APs. In addition, although FIG. 4 only illustrates one small cell radio AP, it should be understood that the teachings of the present disclosure can be extended to a cluster or grid of small cell radio APs, for example in an enterprise environment using similar techniques.

In various embodiments, the method provided by communication system 100 for tracking the mobility of whitelisted UEs in CELL_PCH mode through small cell and macro cell coverage to reduce interference between small cells and macro cells can provide several advantages, such as, for example, reducing downlink (DL) interference to macro UEs (e.g., UEs connected to a macro cell) from residential small cells. Further, the method may not impact the coverage area of a small cell radio AP when a user comes home. Moreover, the method may not impact provisioning requirements for small cells, as whitelists are already used for Closed mode deployments.

Turning to FIGS. 5A-5B, FIGS. 5A-5B are simplified interaction diagrams illustrating example interactions for an example use case associated with managing interference in a network environment based on user presence for a given UE (e.g., UE 110*a*) in CELL_PCH mode in accordance with one potential embodiment of communication system 100. FIGS. 5A-5B include UE 110*a*, small cell radio AP 130*a*, small cell gateway 134, SON management system 180, RNC 174 and macro cell radios 170*a* and 170*g* (as illustrated for the example configuration of RAN 112 shown in FIG. 4). Generally, FIGS. 5A-5B illustrate interactions between various elements of communication system 100 in order provide adaptive power control for a small cell radio AP.

At 502, small cell radio AP 130*a* is activated with a UE whitelist via interactions with small cell gateway 134. In certain embodiments, small cell gateway 134 can query whitelist service 182 to determine the UE whitelist for small cell radio AP 130*a* using a cell identifier of the small cell or other similar identifier. In various embodiments, a UE whitelist can include IMSIs for one or more users/UEs authorized to connect to a given small cell radio AP (e.g., small cell radio AP 130*a*). For the purposes of the present example use case, it is assumed that an IMSI (referred to herein as 'IMSI 1') for the user associated with UE 110*a* is included in the UE whitelist for small cell radio AP 130*a*.

At 504*a*/504*b*, UE 110*a* is assumed to be within the coverage area for small cell radio AP 130*a* and performs a registration per 3GPP standards with small cell radio AP 130*a* and small cell gateway 134. At 506, small cell gateway 134 indicates to SON management system 180 the presence of UE 110*a* attached to small cell radio AP 130*a* (e.g., within a coverage area of small cell radio AP 130*a*). At 508, SON management system 180 records that UE 110*a* is camping on small cell radio AP 130*a*. In various embodiments, SON management system 180 via interference control module 140*b* can maintain and/or update one or more lists that can be used to determine the presence and/or lack of presence of one or more UEs within macro cell coverage areas in a vicinity of one or more small cell radio APs in order to facilitate various features associated with autonomous interference control for communication system 100. By a vicinity, it is meant that the macro cell coverage areas neighbor, surround and/or overlap the intended coverage area of one or more given small cell radio APs for which automated interference control is being provided. In certain embodiments, the one or more lists can also be used to aid in the configuration and/or identification of one or more dominant macro cell radios for a given small cell radio AP and/or group of small cell radio APs.

At 510, it is assumed that the user of UE 110*a* leaves home and, as a result, UE 110*a* performs a registration per 3GPP standards with macro cell radio 170*a* and RNC 174 at 512*a* and 512*b*, respectively. At 514, RNC 174 signals SON management system 180 an indication regarding the presence (e.g., a presence indication) of UE 110*a* attached to macro cell radio 170*a*. The presence indication signaling can include IMSI 1 for UE 110*a* and a cell identifier for macro cell radio 170*a*. In various embodiments, the cell identifier (ID) can be a cell global identity (CGI), a local (NodeB) cell identity, or other similar identity as defined by 3GPP standards.

At 515, SON management system 180 can record that UE 110*a* is camping on macro cell radio 170*a*. In the example use case shown in FIGS. 5A-5B, it is assumed that the re-selection of macro cell radio 170*a* as the first macro cell radio to which UE 110*a* re-selects after leaving the coverage area of small cell radio AP 130*a* is recorded/identified as the dominant macro cell radio associated with small cell radio AP 130*a*. In some embodiments, re-selection history can be based on time and/or statistical aspects or re-selection, for example, determining the frequency of re-selection by the UE within a predetermined time window (e.g., hours, days, weeks, etc.). It should be understood, however, that other methods can be used to identify dominant macro cell radio(s) for one or more given small cell radio APs, as discussed herein in this Specification, such as, for example, small cell and macro cell geography, RF propagation data, macro drive test results, neighbor relationship data, network listen data, re-selection history, handover history combinations thereof or the like.

At 516*a* and 516*b*, UE 110*a* is transitioned to CELL_PCH mode via RNC 174 and macro cell radio 170*a*, respectively. At 518, it is assumed for the example use case that the user of UE 110*a* moves further from home, for example, outside the coverage area of macro cell radio 170*a* and into the coverage area of macro cell radio 170*g*. At 520, UE 110*a* (in CELL_PCH mode) can perform an RRC CELL UPDATE with macro cell radio 170*g*. In some embodiments, UE 110*a* can enter an active state, for example, to initiate a voice call in the coverage area of macro cell radio 170*g*, and can seek establish an RRC connection with 170*g*. Accordingly, an RRC CELL UPDATE via CELL_PCH mode and/or an RRC connection can be used to signal UE presence within the coverage area of macro cell radio 170*g* in various embodiments.

At 522, macro cell radio 170*g* can signal the RRC CELL UPDATE or RRC connection request to RNC 174, depending on the signaling received from UE 110*a*. The interactions can continue as shown in FIG. 5B. At 524, RNC 174 signals SON management system 180 an indication regarding the presence (e.g., a presence indication) of UE 110*a* attached to macro cell radio 170*g*. The presence indication signaling can include IMSI 1 for UE 110*a* and a cell identifier for macro cell radio 170*g*. At 526, SON management system 180 recognizes that UE 110*a* has moved away from the coverage area of macro cell radio 170*a* that is dominant around small cell radio AP 130*a*, which triggers SON management system 180 at 528 to signal small cell radio AP 130*a* to turn off its transmit functionality or reduce its transmit power.

At 530, it is assumed that the user of UE 110*a* now moves back closer to home and, more specifically, back into the coverage area of macro cell radio 170*a*. At 532, UE 110*a* (in CELL_PCH mode) can perform an RRC CELL UPDATE with macro cell radio 170*a* or in certain embodiments UE 110*a* can initiate an RRC connection with macro cell radio 170*a* if in an active state. At 534, macro cell radio 170*a* can signal the RRC CELL UPDATE or RRC connection request to RNC 174 depending on the signaling received from UE 110*a*. At 536, RNC 174 signals SON management system 180 an indication regarding the presence of UE 110*a* attached to macro cell radio 170*a*. The signaling can include IMSI 1 for UE 110*a* and the cell identifier for macro cell radio 170*a*.

At 538, SON management system 180 recognizes that UE 110*a* has moved to the coverage area of macro cell radio 170*a* that is dominant around small cell radio AP 130*a*, which triggers SON management system 180 at 540 to signal small cell radio AP 130*a* to turn on its transmit functionality or return its transmit power to a normal level (e.g., $P_{NORMAL}$). At 542, the user of UE 110*a* may return home and small cell radio AP 130*a* is already up and functioning and UE 110*a* can again perform a registration with small cell radio AP 130*a* and small cell gateway 134 at 544*a* and 544*b*, respectively.

Accordingly, SON management system 180 can track UE presence and/or lack of UE presence with respect to the coverage area of one or more dominant macro cell radios and can use UE presence to trigger automated interference control for small cell radio APs, as illustrated via the example use case of FIGS. 5A-5B. As noted above, SON management system 180 via interference control module 140*b* can, in various embodiments, maintain and/or update one or more lists that can be used to determine the presence or lack of presence of one or more UEs within macro cell coverage areas in a vicinity of one or more small cell radio APs in order to facilitate various features associated with autonomous interference control for communication system 100.

Turning to FIG. 6, FIG. 6 is a simplified flow diagram illustrating example operations 600 associated with SON management system 180 determining UE presence in a vicinity of one or more small cell radio APs in order to facilitate interference management in accordance with one potential embodiment of communication system 100. In various embodiments, a set of one or more 'nearby UEs' can be maintained/updated for each of one or more given small cell radio APs to indicate when certain UEs that are allowed to access the respective small cell APs are or are not in a vicinity of the respective small cell radio APs to facilitate interference management for the respective small cell APs. In various embodiments, operations 600 can be performed using any combination of hardware processors of small cell management system 136, SON management system 180, small cell gateway 134, whitelist service 182 and/or RNC 174 as well as any of small cell radio APs 130*a*-130*b* and/or macro cell radios 170*a*-170*j*.

At any time, UEs can move around within communication system 100 and UE presence with respect to one or more small cell radio APs can be determined. Thus, the operations can start at 602 in which a presence indication can be received by SON management system 180 for a given UE in CELL_PCH mode (e.g., and of UE 110*a*-110*c*) that has transitioned to a coverage area of a given macro cell radio. In various embodiments, the presence indication can be the result of a cell update received by RNC 174, which can trigger signaling the UE presence indication to SON management system 180. In various embodiments, the presence indication can include the IMSI for the user of the UE and the cell ID for the macro cell radio from which the update was received.

At 604, SON management system 180 can determine a list of one or more small cell radio APs in a vicinity of the macro cell radio (e.g., a list of small cell radio APs having overlapping/nearby coverage areas for which the macro cell radio is the dominant macro cell radio). In various embodiments, the determination can be based on information predetermined for SON management system 180 including, but not limited to, small cell and macro cell geography, RF propagation data, macro drive test results, neighbor relationship data, network listen data, re-selection history, handover history combinations thereof or the like.

At 606, SON management system 180 can reduce the list of small cell radio APs based on which small cell radio APs on which the UE is allowed to a reduced list of small cell radio APs. In various embodiments, the reduction can be performed through a whitelist comparison using an IMSI of the user of the UE with respect to the whitelists configured or set for the one or more small cell APs in the vicinity of the macro cell radio.

At 608, SON management system 180 can add the UE (e.g., add the IMSI for the user of the UE) into a set of 'nearby UEs' maintained for the reduced list of small cell radio APs on which the UE is allowed. In various embodiments, a 'set' can be a data structure that has unique elements so if a same UE entry is added twice into a given set, it will only be listed once within the set. This may differ from a list-like data structure in which a same UE entry, if added twice to the list, can appear in duplicate entries. In some embodiments, rather than or in addition to maintaining a set of 'nearby UEs' for each small cell, each UE (e.g., each IMSI) can be tracked according to a set of one or more small cells to which it is allowed to connect. As the UE re-selects a macro cell radio, a determination of At 610, SON management system 180 can remove the UE (e.g., remove the IMSI of the user of the UE) from all other small cell radio AP's 'nearby UEs' sets where the UE may be listed. In various embodiments, the operations performed at 610 can be used when a UE has moved outside the coverage area of a macro cell radio that is in the vicinity of one or more small cell radio APs (e.g., has moved away from the dominant macro cell radio(s)) and/or to catch any corner-cases where a UE may be turned off as its user moves between macro cell coverage areas and is then turned-back on within the coverage area of a macro cell radio that is not in the vicinity of the small cell radio AP to which the UE was previously attached.

Following the adding or removing a UE from any set(s) 'nearby UEs' for any small cell radio AP(s), the operations can continue to 612 in which SON management system 180 can determine all small cell radio AP(s) where the UE was added to or removed from their corresponding 'nearby UEs) set(s) (e.g., having an updated set of 'nearby UEs'). At 614, SON management system 180 can select a given small cell radio AP having an updated 'nearby UEs' set to perform a check on the size of the updated set. At 616, the operations can include determining if the set size for the selected small cell radio AP is greater than zero (0). If the set size for the selected small cell radio AP is greater than zero, the operations can continue to 618 in which the transmit power for the small cell radio AP can be increased (e.g., if it had been previously decreased) or can be activated (e.g., if it had been previously deactivated) or an increased or activated transmit power for the small cell radio AP can be maintained (e.g., if the set size remains greater than zero through multiple checks of a 'nearby UEs' set for a given small cell radio AP, this can be an indication that there are other UEs allowed on and in the vicinity of the small cell radio AP in which case the increased or activated transmit power can be maintained for the small cell radio AP through the multiple checks).

If the set size of 'nearby UEs' for the selected small cell radio AP is not greater than zero (e.g., is less than or equal to zero), the operations can continue to 620 in which the transmit power for the small cell radio AP can be reduced (e.g., if it was previously at an increased transmit power level) or deactivated (e.g., if it had been previously activated) or a reduced or deactivated transmit power for the small cell radio AP can be maintained (e.g., if the set size remains less than or equal to zero through multiple checks of a 'nearby UEs' set for a small cell radio, this can be an indication that none of any other UEs allowed on the small cell radio AP are in its vicinity in which case the reduced or deactivated transmit power can be maintained for the small cell radio AP through the multiple checks).

Following the operations at either 618 or 620, the operations can continue to 622, in which SON management system 180 can determine if there are any remaining small cell radio AP(s) having updated set(s) to be checked (e.g., other small cell radio AP(s) where the UE was added or removed). If so, the operations can return to 614 and operations 616 and 618 or 620 can be repeated for each selected small cell radio AP for which the UE was added or removed from its corresponding set of 'nearby UEs'. If there are no other small cell radio AP(s) having updated set(s) of 'nearby UEs', the operations can return to 602 in which a presence indication can be received for another UE and/or the same UE in CELL_PCH mode and the operations can be repeated. Accordingly, the operations shown in FIG. 6 can, in various embodiments, facilitate reducing interference with one or more macro cell radio(s) in the vicinity of one or more small cell radio APs through management of the transmit power of the one or more small cell radio AP(s) based on UE presence or lack of UE presence in the coverage areas of the macro cell radios in the vicinity of the small cell radio APs.

Turning to FIG. 7, FIG. 7 is a simplified flow diagram illustrating other example operations 700 associated with managing interference in a network environment based on user presence in accordance with one potential embodiment of communication system 100. In various embodiments, operations 700 can be performed using any combination of hardware processors of small cell management system 136, SON management system 180, small cell gateway 134, whitelist service 182 and/or RNC 174 as well as any of small cell radio APs 130a-130b and/or macro cell radios 170a-170j.

At any time, UEs can move around within communication system 100 and UE presence with respect to one or more small cell radio APs can be determined. Thus, operations can begin at 702 in which SON management system 180 can determine that a given UE (e.g., any of UE 110a-110c) in CELL_PCH mode has changed its selected macro cell radio. At 704, SON management system 180 can determine that the UE is allowed service on a small cell radio located in a vicinity of a macro cell coverage area of a macro cell radio that the UE has selected.

At 706, SON management system can adjust a transmit power of the small cell radio based on a presence of the UE in a surrounding macro cell coverage area of the small cell radio. In certain embodiments, adjusting the transmit power can include turning off a transmitter of the small cell radio if the UE leaves the surrounding macro cell coverage area. In other embodiments, the adjusting the transmit power can include reducing a transmit power of the small cell radio if the UE leaves the surrounding macro cell coverage area. In some embodiments, the adjusting the transmit power can include increasing the transmit power to a normal level if the UE enters the surrounding macro cell coverage area from an area outside the macro cell coverage area.

The operations can continue to determine that one or more UE in CELL_PCH mode have changed their selected macro cell radio for communication system 100 and can adjust the transmit power of any small cell radios that the UE are allowed on based on a presence of the respective UE within respective coverage areas surrounding the respective small cell radios as configured by network operator and/or service provider.

Figure 8A:
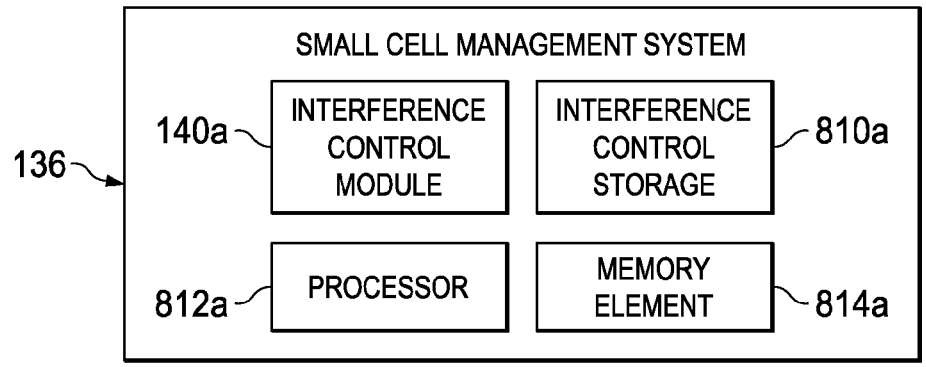
FIGS. 8A-8C are simplified block diagrams illustrating additional details associated with various potential embodiments of the communication system.
Figure 8B:
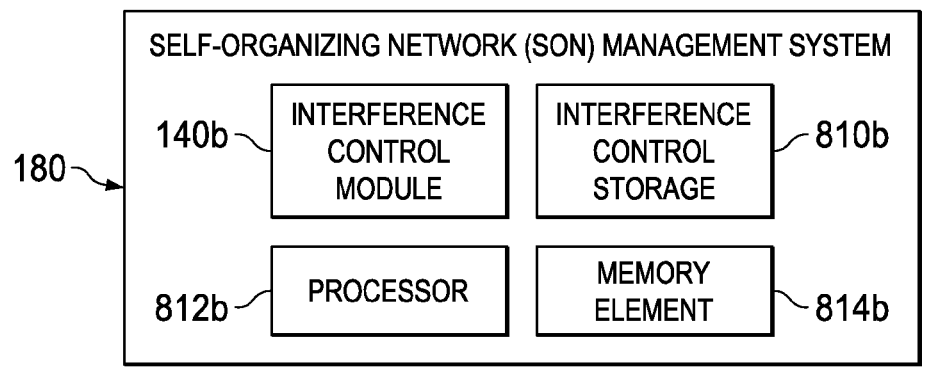
Figure 8C:
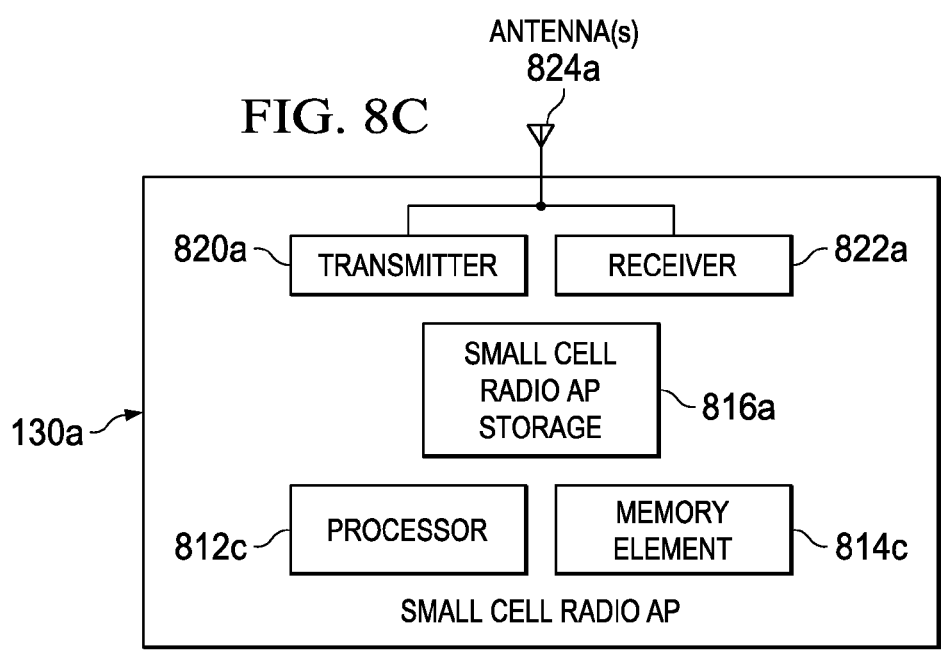

Turning to FIGS. 8A-8C, FIGS. 8A-8C are simplified block diagrams illustrating additional details of various apparatuses associated with various potential embodiments of communication system 100. FIG. 8A illustrates an embodiment of small cell management system 136 of communication system 100. FIG. 8B illustrates an embodiment of SON management system 180 of communication system 100. FIG. 8C illustrates an embodiment of small cell radio AP 130a of communication system 100. Although only small cell radio AP 130a is illustrated in FIG. 8C, it should be understood that small cell radio AP 130b can be configured in a similar manner to small cell radio AP 130a.

As shown in FIG. 8A, small cell management system 136 can include interference control module 140a, an interference control storage 810a, a processor 812a and a memory element 814a. In at least one embodiment, processor 812 is a hardware processor configured to execute various tasks, operations and/or functions of small cell management system 136 as described herein and memory element 814 is configured to store data associated with small cell management system 136. In at least one embodiment, interference control module 140a is configured to implement the various interference management functions as further described herein for small cell management system 136. In various embodiments, interference control storage 810a can be configured to store one or more power reduction levels for each of small cell radio APs 130a-130b that may be operated in an interference limiting mode, timer information for one or more timers for operating the small cell radio APs in an interference limiting mode, combinations thereof or any other information that may be related to interference management of the small cell system as further described herein.

As shown in FIG. 8B, SON management system 180 can include interference control module 140b, an interference control storage 810b, a processor 812b and a memory element 814b. In at least one embodiment, processor 812b is a hardware processor configured to execute various tasks, operations and/or functions of SON management system 180 as described herein and memory element 814b is configured to store data associated with SON management system 180. In at least one embodiment, interference control module 140b is configured to implement the various interference management functions as further described herein for SON management system 180. In various embodiments, interference control storage 810b can be configured to store macro cell radio and small cell radio AP relationship information (e.g., small cell radio APs that may a vicinity of one or more macro cell radios, dominant macro cell radio information, etc.), small cell radio AP and wireless radio AP relationship information (e.g., wireless radio APs that may be in a vicinity of a coverage area or intended coverage area of one or more small cell radio APs of the small cell system), combinations thereof or the like.

As shown in FIG. 8C, small cell radio AP 130a can include a small cell radio AP storage 816a, a processor 812c, a memory element 814c, a transmitter 820a, a receiver 822a and one or more antenna(s) 824a. In at least one embodiment, processor 812c is a hardware processor configured to execute various tasks, operations and/or functions of small cell radio AP 130a as described herein and memory element 814c is configured to store data associated with small cell radio AP 130a. In at least one embodiment, small cell radio AP 130a is configured to respond to the various interference management functions as further described herein such as, for example, reducing power transmit levels of transmitter 820a and/or turning off transmitter 820a. In various embodiments, small cell radio AP storage 816a can be configured to store various information including, but not limited to, cluster or grid information for a cluster or grid to which small cell radio AP 130a may belong, whitelist information for one or more UE allowed to connect to the small cell radio AP (e.g., as configured and/or retrieved via whitelist service 184), LAC/RAC/TAC information, physical layer identification information (e.g., primary scrambling code (PSC), physical cell identity (PCI)), cell identification information, neighbor list information, dominant macro cell information, combinations thereof or the like. In various embodiments, transmitter 820a and receiver 822a can be connected to one or more antennas 824a to facilitate the transmission and/or reception of cellular data and/or information to/from one or more UE (e.g., UE 110a-110c) using one or more over-the-air control channels, data channels, combinations thereof or the like as prescribed by 3GPP standards.

In regards to the internal structure associated with communication system 100, each of UE 110a-110c, small cell radio AP 130b, wireless radio APs 160a-160c, macro cell radios 170a-170j, small cell gateway 134, wireless LAN controller 162, wireless LAN gateway 164, RNC 174 and whitelist service 182 may each also include a respective processor and a respective memory element. Small cell radio AP 130b, wireless radio APs 160a-160c and macro cell radios 170a-170j can each additionally include one or more transmitters, receivers and/or antennas to facilitate over-the-air communications. Hence, appropriate software, hardware and/or algorithms are being provisioned in UE 110a-110c, small cell radio AP 130a-130b, wireless radio AP 160a-160c, macro cell radio 170a-170j, small cell gateway 134, small cell management system 136, wireless LAN controller 162, wireless LAN gateway 164, RNC 174, SON management system 180 and whitelist service 182 in order to facilitate interference management between cells of a communication system. Note that in certain examples, certain databases (e.g., for storing information associated with interference control and/or management for communication system 100) can be consolidated with memory elements (or vice versa), or the storage can overlap/exist in any other suitable manner.

In one example implementation, UE 110a-110c, small cell radio AP 130a-130b, wireless radio AP 160a-160c, macro cell radio 170a-170j, small cell gateway 134, wireless LAN controller 162, wireless LAN gateway 164, RNC 174 and whitelist service 182 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate interference management operations (e.g., for networks such as those illustrated in FIGS. 1 and 4). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 110a-110c, small cell radio AP 130a-130b, wireless radio AP 160a-160c, macro cell radio 170a-170j, small cell gateway 134, wireless LAN controller 162, wireless LAN gateway 164, RNC 174 and whitelist service 182 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 110a-110c, small cell radio AP 130a-130b, wireless radio AP 160a-160c, macro cell radio 170a-170j, small cell gateway 134, wireless LAN controller 162, wireless LAN gateway 164, RNC 174 and whitelist service 182 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the interference management functions as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 8A-8C] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIGS. 8A-8C] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining, by a self-organizing network (SON) management system, a presence of one or more user equipment (UE) in relation to one or more small cell radios of a small cell network based on information obtained through the small cell network and one or more parallel networks, wherein the one or more parallel networks include, at least in part, a WiFi network;
   determining a presence of the one or more UE in relation to one or more wireless radios of the WiFi network;
   determining whether any of the one or more UE are within a potential coverage area of one or more small cells radio based, at least in part, on a location of the one or more wireless radios of the WiFi network; and
   adjusting, by the SON management system, transmit power for one or more small cell radios of the small cell network based, at least in part, on the presence of one or more UE in relation to the one or more small cell radios of the small cell network, wherein the adjusting comprises increasing the transmit power for at least one small cell radio from a reduced power level based on a determination that at least one UE is within a potential coverage area of the at least one small cell radio and that the at least one UE is authorized to connect to the at least one small cell radio.

2. The method of claim 1, wherein determining the presence of the one or more UE includes detecting one or more location updates for the one or more UE within the small cell network.

3. The method of claim 1, wherein determining the presence of the one or more UE includes detecting one or more wireless beacons of the one or more UE being received by the one or more wireless radios of the WiFi network.

4. The method of claim 1, wherein the potential coverage area of the at least one small cell radio is determined based, at least in part, on a coverage area provided by the at least one small cell radio at a maximum transmit power, a normal transmit or a nominal transmit power.

5. The method of claim 1, wherein determining the presence of the one or more UE in relation to one or more wireless radios of the WiFi network further comprises:
   receiving one or more wireless beacons transmitted by at least one UE at the one or more wireless radios of the WiFi network; and
   identifying a user associated with the at least one UE based, at least in part, on a relationship between an International Mobile Subscriber Identity (IMSI) of the user and a Media Access Control (MAC) address for the at least one UE.

6. The method of claim 1, wherein adjusting the transmit power includes adjusting a pilot channel transmit power for each of the one or more small cell radios.

7. The method of claim 1, wherein adjusting the transmit power includes reducing the transmit power for a particular small cell radio based on a determination that no UE are present within a coverage area of the particular small cell radio.

8. The method of claim 1, wherein adjusting the transmit power further comprises:
   determining whether one or more UE are present in a coverage area of a particular small cell radio upon expiration of each of a plurality of timers; and
   reducing the transmit power for the particular small cell radio based on a determination that no UE are present within the coverage area of the small cell radio at expiration of each of the plurality of timers.

9. The method of claim 1, wherein adjusting the transmit power includes increasing the transmit power for a particular small cell radio from a reduced level to one or more increased levels upon determining the presence of a plurality of UEs near a potential coverage area that the particular small cell radio is capable of providing.

10. The method of claim 1, wherein adjusting the transmit power includes increasing the transmit power for a particular small cell radio from a reduced level to a normal level upon determining that a number of UEs present near a potential coverage area that the particular small cell radio is capable of providing reaches a threshold number of UEs.

11. One or more non-transitory tangible media encoding logic that include instructions for execution by a processor, wherein the execution causes the processor perform operations, comprising:
   determining, by a self-organizing network (SON) management system, a presence of one or more user equipment (UE) in relation to one or more small cell radios of a small cell network based on information obtained through the small cell network and one or more parallel networks, wherein the one or more parallel networks include, at least in part, a WiFi network;
   determining a presence of the one or more UE in relation to one or more wireless radios of the WiFi network;
   determining whether any of the one or more UE are within a potential coverage area of one or more small cells radio based, at least in part, on a location of one or more wireless radios of the WiFi network; and adjusting transmit power for one or more small cell radios of the small cell network based, at least in part, on the presence of one or more UE in relation to the one or more small cell radios of the small cell network, wherein the adjusting comprises increasing the transmit power for at least one small cell radio from a reduced power level based on a determination that at least one UE is within a potential coverage area of the at least one small cell radio and that the at least one UE is authorized to connect to the at least one small cell radio.

12. The media of claim 11, wherein determining the presence of the one or more UE includes detecting one or more location updates for the one or more UE within the small cell network.

13. The media of claim 11, wherein determining the presence of the one or more UE includes detecting one or more wireless beacons of the one or more UE being received by the one or more wireless radios of the WiFi network.

14. The media of claim 11, wherein the potential coverage area of the at least one small cell radio is determined based, at least in part, on a coverage area provided by the at least one small cell radio at a maximum transmit power, a normal transmit or a nominal transmit power.

15. The media of claim 11, wherein determining the presence of the one or more UE in relation to one or more wireless radios of the WiFi network further comprises:
receiving one or more wireless beacons transmitted by at least one UE at the one or more wireless radios of the WiFi network; and
identifying a user associated with the at least one UE based, at least in part, on a relationship between an International Mobile Subscriber Identity (IMSI) of the user and a Media Access Control (MAC) address for the at least one UE.

16. A communication system comprising:
a self-organizing network (SON) management system, comprising:
a memory element for storing data; and
a processor for executing instructions associated with the data, wherein the executing causes the communication system to perform operations, comprising:
determining, by the SON management system, a presence of one or more user equipment (UE) in relation to one or more small cell radios of a small cell network based on information obtained through the small cell network and one or more parallel networks, wherein the one or more parallel networks include, at least in part, a WiFi network;
determining a presence of the one or more UE in relation to one or more wireless radios of the WiFi network;
determining whether any of the one or more UE are within a potential coverage area of one or more small cells radio based, at least in part, on a location of the one or more wireless radios of the WiFi network; and
adjusting transmit power for one or more small cell radios of the small cell network based, at least in part, on the presence of one or more UE in relation to the one or more small cell radios of the small cell network, wherein the adjusting comprises increasing the transmit power for at least one small cell radio from a reduced power level based on a determination that at least one UE is within a potential coverage area of the at least one small cell radio and that the at least one UE is authorized to connect to the at least one small cell radio.

17. The communication system of claim 16, wherein determining the presence of the one or more UE includes detecting one or more location updates for the one or more UE within the small cell network.

18. The communication system of claim 16, wherein determining the presence of the one or more UE in relation to one or more wireless radios of the WiFi network further comprises:
receiving one or more wireless beacons transmitted by at least one UE at the one or more wireless radios of the WiFi network; and
identifying a user associated with the at least one UE based, at least in part, on a relationship between an International Mobile Subscriber Identity (IMSI) of the user and a Media Access Control (MAC) address for the at least one UE.

19. The communication system of claim 16, wherein adjusting the transmit power includes adjusting a pilot channel transmit power for each of the one or more small cell radios.

20. The communication system of claim 16, wherein adjusting the transmit power includes reducing the transmit power for a particular small cell radio based on a determination that no UE are present within a coverage area of the particular small cell radio.

* * * * *